(12) United States Patent
Gao et al.

(10) Patent No.: US 11,659,527 B2
(45) Date of Patent: May 23, 2023

(54) APPARATUS FOR SENDING INFORMATION REGARDING RMSI PERIOD

(71) Applicant: Huawei Technologies Co., Ltd., Shenzhen (CN)

(72) Inventors: Kuandong Gao, Chengdu (CN); Huang Huang, Chengdu (CN); Sainan Li, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/786,535

(22) Filed: Feb. 10, 2020

(65) Prior Publication Data
US 2020/0178253 A1 Jun. 4, 2020

Related U.S. Application Data

(63) Continuation of application No. PCT/CN2018/099624, filed on Aug. 9, 2018.

(30) Foreign Application Priority Data

Aug. 11, 2017 (CN) .......................... 201710690892.6

(51) Int. Cl.
H04L 1/00 (2006.01)
H04W 72/0446 (2023.01)
(Continued)

(52) U.S. Cl.
CPC ....... H04W 72/0446 (2013.01); H04L 1/0027 (2013.01); H04L 1/18 (2013.01);
(Continued)

(58) Field of Classification Search
CPC .......... H04W 36/0007; H04W 72/005; H04W 76/40; H04W 56/001; H04W 74/08;
(Continued)

(56) References Cited

U.S. PATENT DOCUMENTS

2013/0226324 A1 8/2013 Hannuksela et al.
2015/0181575 A1 6/2015 Ng et al.
(Continued)

FOREIGN PATENT DOCUMENTS

CN 101651988 A 2/2010
CN 103493516 A 1/2014
(Continued)

OTHER PUBLICATIONS

R1-1707339, "Details on NR PBCH design", May 15-19, 2017, pp. 1-8 (Year: 2017).*
(Continued)

Primary Examiner — Salvador E Rivas
(74) Attorney, Agent, or Firm — Slater Matsil, LLP

(57) ABSTRACT

An information sending and receiving method and an apparatus are disclosed. In an embodiment an information sending apparatus includes a processor configured to determine, based on a physical broadcast channel (PBCH) period or a synchronization signal block burst set (SS block burst set) period, a period in which remaining minimum system information (RMSI) is to be sent and a sender configured to send the RMSI to a terminal device by using X as the period, wherein X is a multiple of the PBCH period, or X and the PBCH period are in a one-to-one correspondence or a one-to-many relationship, and wherein a network device is configured to send at least one piece of RMSI by using at least one beam or antenna port.

32 Claims, 14 Drawing Sheets

(51) Int. Cl.
| | |
|---|---|
| *H04W 16/28* | (2009.01) |
| *H04W 56/00* | (2009.01) |
| *H04W 72/00* | (2023.01) |
| *H04W 52/02* | (2009.01) |
| *H04W 72/1263* | (2023.01) |
| *H04L 1/18* | (2023.01) |
| *H04L 12/40* | (2006.01) |
| *H04W 52/14* | (2009.01) |
| *H04W 74/08* | (2009.01) |
| *H04N 21/6375* | (2011.01) |

(52) U.S. Cl.
CPC ......... *H04L 12/4015* (2013.01); *H04W 16/28* (2013.01); *H04W 52/0216* (2013.01); *H04W 56/001* (2013.01); *H04W 72/005* (2013.01); *H04W 72/1263* (2013.01); *H04N 21/6375* (2013.01); *H04W 52/14* (2013.01); *H04W 74/08* (2013.01)

(58) Field of Classification Search
CPC ............. H04W 52/14; H04W 52/0216; H04W 72/1263; H04L 41/028; H04L 12/413; H04L 29/08945; H04L 5/0055; H04L 1/0027; H04L 1/18; H04L 12/4015; H04N 21/6375
See application file for complete search history.

(56) References Cited

U.S. PATENT DOCUMENTS

| | | | |
|---|---|---|---|
| 2015/0223258 A1 | 8/2015 | Jung et al. | |
| 2017/0222771 A1 | 8/2017 | Chendamarai Kannan et al. | |
| 2018/0007679 A1* | 1/2018 | Lee | H04B 7/26 |
| 2018/0376511 A1* | 12/2018 | Tsai | H04W 72/14 |
| 2019/0021119 A1* | 1/2019 | Ng | H04W 72/042 |
| 2019/0159258 A1* | 5/2019 | Islam | H04L 5/0048 |
| 2019/0306847 A1* | 10/2019 | Seo | H04B 7/0417 |
| 2020/0068512 A1* | 2/2020 | Xue | H04L 27/261 |
| 2020/0068513 A1* | 2/2020 | Takeda | H04W 72/04 |
| 2020/0145950 A1* | 5/2020 | Harada | H04W 56/0015 |

FOREIGN PATENT DOCUMENTS

| | | |
|---|---|---|
| CN | 105723765 A | 6/2016 |
| CN | 106879040 A | 6/2017 |
| CN | 106921468 A | 7/2017 |
| CN | 106465363 B | 7/2019 |
| WO | 2016061739 A1 | 4/2016 |
| WO | 2016121514 A1 | 8/2016 |

OTHER PUBLICATIONS

R1-1708233, "SS block time index indication", May 15-19, 2017, pp. 1-8 (Year: 2017).*
R1-1708326, "On SS Block Time Index Indication in NR", May 15-19, 2017, pp. 1-3 (Year: 2017).*
R1-1708723, "NR delivery of remaining system information", May 15-19, 2017, pp. 1-4 (Year: 2017).*
Ericsson, "Radio link monitoring", 3GPP TSG-RAN WG1 NR Ad-Hoc#2, R1-1711386, Qingdao, China, Jun. 27-30, 2017, total 7 pages.
Nokia, "Repetition Period of System Information Blocks in Cell Selection and Reselection Scenarios", TSG-RAN Working Group 4 (Radio) AdHoc, R4S 000046, Apr. 27-28, 2000, XP050180776, total 2 pages.
Ericsson, "NR delivery of remaining system information", 3GPP TSG-RAN WG1 Meeting #89, R1-1708723, May 15-19, 2017, XP051263290, total 4 pages.
Fujitsu, "Discussion on the CORESET for RMSI delivery", 3GPP TSG RAN WG1 NR Ad-Hoc#2, R1-1710233, Qingdao, P.R. China, Jun. 27-30, 2017, 4 pages.
3GPP TS 38.331 V0.0.4 (Jun. 2017), 3rd Generation Partnership Project; Technical Specification Group Radio Access Network; NR; Radio Resource Control (RRC); Protocol specification (Release 15), Jun. 2017, 22 pages.
Huawei, et al., "Discussion and evaluation on NR-PBCH design," 3GPP TSG RAN WG1 Meeting #89, Hangzhou, China, May 15-19, 2017, R1-1708162, 8 pages.
Ericsson, "NR delivery of remaining system information," 3GPP TSG-RAN WG1 Meeting #88, Athens, Greece, Feb. 13-17, 2017, R1-1702125, 4 pages.
Xinwei, "Discussion on RMSI delivery," 3GPP TSG RAN WG1 Meeting #90, Prague, Czech Republic, Aug. 21, 25, 2017, R1-1712273, 4 pages.
Samsung, "Remaining system information delivery", 3GPP TG RAN WG1 meeting #89, R1-1707930, May 15-19, 2017, 4 Pages, Hangzhou, P.R. China.

* cited by examiner

APPARATUS FOR SENDING INFORMATION REGARDING RMSI PERIOD

CROSS-REFERENCE TO RELATED APPLICATIONS

This application is a continuation of International Application No. PCT/CN2018/099624, filed on Aug. 9, 2018, which claims priority to Chinese Patent Application No. 201710690892.6, filed on Aug. 11, 2017. The disclosures of the aforementioned applications are hereby incorporated by reference in their entireties.

TECHNICAL FIELD

The present invention relates to the field of network communications, and in particular, to an information sending and receiving method and apparatus.

BACKGROUND

In a 5G communications system, a carrier frequency, such as 6 GHz, higher than that in long term evolution (LTE) is used to implement wireless communication with larger bandwidth and a higher transmission rate. Because the carrier frequency is relatively high, a radio signal transmitted by using the carrier frequency experiences more severe fading in a space propagation process, and even it is difficult to detect the radio signal at a receive end, in the 5G communications system, a beamforming technology is used to obtain a beam with good directivity, so as to increase power in a transmit direction, thereby improving a signal to interference plus noise ratio (SINR) at the receive end. To improve communication quality, the beamforming technology is also used on a terminal device side to generate analog beams in different directions, so as to receive and send data. Because both a base station and user equipment perform communication by using a relatively narrow analog beam, better communication quality is obtained only when an analog beam used for sending and an analog beam used for receiving are aligned. Therefore, it is determined in a 3GPP RAN1 conference that a beam pair between the base station and the terminal device is determined in a beam sweeping process in new radio (NR).

However, beam sweeping brings many problems, one of the problems is that overheads of broadcast information transmission increase. To flexibly schedule the overheads of the broadcast information transmission, a plurality of SS block burst set periods: 5 ms, 10 ms, 20 ms, 40 ms, 80 ms, or 160 ms are defined in NR, so as to be more flexibly applicable to more application scenarios. In NR, a synchronization signal block (SS block) is a combination of PSS-PBCH-SSS-PBCH. The SSS is a secondary synchronization signal (SSS), the PSS is a primary synchronization signal (PSS), and the PBCH is a physical broadcast channel. Therefore, a PBCH period may also be understood as an SS block burst set period. FIG. 1 is a schematic structural diagram of a synchronization signal block burst set (SS block burst set) according to this application. A plurality of synchronization signal blocks further constitute a synchronization signal block burst SS block burst, and a plurality of SS block bursts further constitute a synchronization signal block burst set SS block burst set.

In NR, master information block (MIB) information on the PBCH and remaining minimum system information (RMSI) on a physical downlink shared channel (PDSCH) jointly carry complete content of minimum system information (MSI). It may be understood that there may be a plurality of possibilities for an RMSI period due to a plurality of possibilities of the SS block burst set period. Therefore, the RMSI period needs to be defined for effectively obtaining the MSI.

SUMMARY

Embodiments provide an information sending and receiving method and apparatus, to resolve a technical problem of how a terminal device effectively obtains RMSI in NR.

According to a first aspect, an embodiment provides an information sending method, and the method may include sending, by a network device, remaining minimum system information RMSI to a terminal device by using X as a period, where X is a multiple of a PBCH period, or X and the PBCH period are in a one-to-one correspondence or a one-to-many relationship, and in a process in which the RMSI is sent once, the network device sends at least one piece of RMSI by using at least one beam or antenna port.

The RMSI may also have another name in NR, for example, an SIB 1. In an embodiment, the RMSI is only used as an example, and a name of the system information is not limited.

In all embodiments of this application, the RMSI includes at least one of the following information: configuration information of a random access channel, configuration information of a paging channel, configuration information of a downlink shared channel, configuration information of an uplink shared channel, a public land mobile network identifier list, a tracking area code, cell barring access information, scheduling information of other system information (OSI) or a system information block SIB, a system information value tag, bandwidth indication information, and cell reselection information.

According to a second aspect, an embodiment provides an information sending method, and the method may include sending, by a network device, remaining minimum system information RMSI to a terminal device by using X as a period in one transmission time interval TTI period, or sending, by a network device, RMSI to a terminal device X times in one TTI period, where the TTI period is a preset value, X is a multiple of a PBCH period, or X and the PBCH period are in a one-to-one correspondence or a one-to-many relationship, and in a process in which the RMSI is sent once, the network device sends at least one piece of RMSI by using at least one beam or antenna port.

In a possible implementation, the method further includes sending, by the network device, indication information to the terminal device, where the indication information is used to indicate the PBCH period.

In this embodiment, an association relationship between X and the PBCH period is defined, where X is a period in which the repeated RMSI is to be transmitted in one TTI, so that when the terminal device learns of the PBCH period and the TTI period, the terminal device may further learn of a broadcast period of the RMSI based on the association relationship, so that the terminal device can obtain the RMSI.

According to a third aspect, an embodiment provides an information sending method, and the method may include sending, by a network device, remaining minimum system information RMSI to a terminal device by using X as a period in one transmission time interval TTI period, or sending, by a network device, RMSI to a terminal device X times in one TTI period, where X is a preset value, the TTI period is a multiple of a PBCH period, or the TTI period and the PBCH period are in a one-to-one correspondence or a one-to-many relationship, and in a process in which the RMSI is sent once, the network device sends at least one piece of RMSI by using at least one beam or antenna port.

In a possible implementation, the method further includes: indicating, by the network device, a value of X by using signaling.

In a possible implementation, the method further includes: sending, by the network device, indication information to the terminal device, where the indication information is used to indicate the PBCH period.

In this embodiment, an association relationship between the TTI period of the RMSI and the PBCH period is defined, so that when the terminal device learns of the PBCH period and a quantity of times of repeated transmission, the terminal device may further learn of a broadcast period of the RMSI based on the association relationship, so that the terminal device can obtain the RMSI.

According to a fourth aspect, an embodiment provides an information receiving method, and the method may include determining, by a terminal device based on a physical broadcast channel PBCH period, a first time point at which RMSI is to be received, where the RMSI is RMSI sent by a network device to the terminal device by using X as a period, and X is a multiple of the PBCH period; or X and the PBCH period are in a one-to-one correspondence or a one-to-many relationship, and in a process in which the RMSI is sent once, the network device sends at least one piece of RMSI by using at least one beam or antenna port and receiving, by the terminal device, the RMSI based on the first time point.

In a possible implementation, X is the multiple of the PBCH period.

In a possible implementation, X and the PBCH period are in a one-to-one correspondence or a one-to-many relationship.

In a possible implementation, the method further includes: receiving, by the terminal device, indication information sent by the network device, where the indication information is used to indicate the PBCH period.

According to a fifth aspect, an embodiment provides an information receiving method, and the method may include determining, by a terminal device based on a physical broadcast channel PBCH period, a first time point at which RMSI is to be received, where the RMSI is RMSI received by the terminal device from a network device by using X as a period in one transmission time interval TTI period, or RMSI received by the terminal device from a network device X times in one TTI period, the TTI period is a preset value, X is a multiple of the PBCH period, or X and the PBCH period are in a one-to-one correspondence or a one-to-many relationship, and in a process in which the RMSI is received once, the terminal device receives at least one piece of RMSI by using at least one beam or antenna port and receiving, by the terminal device, the RMSI based on the first time point.

In a possible implementation, the method further includes: receiving, by the terminal device, indication information sent by the network device, where the indication information is used to indicate the PBCH period.

According to a sixth aspect, an embodiment provides an information receiving method, and the method may include determining, by a terminal device based on a physical broadcast channel PBCH period, a first time point at which RMSI is to be received, where the RMSI is RMSI received by the terminal device from a network device by using X as a period in one transmission time interval TTI period, or RMSI received by the terminal device from a network device X times in one TTI period, X is a preset value, the TTI period is a multiple of the PBCH period, or the TTI period and the PBCH period are in a one-to-one correspondence or a one-to-many relationship, and in a process in which the RMSI is received once, the terminal device receives at least one piece of RMSI by using at least one beam or antenna port and receiving, by the terminal device, the RMSI based on the first time point.

In a possible implementation, the method further includes: receiving, by the terminal device, indication information sent by the network device, where the indication information is used to indicate the PBCH period.

In this embodiment, an association relationship between the RMSI period X and the PBCH period is defined. In this way, when the terminal device learns of the PBCH period, the terminal device may further learn of a broadcast period of the RMSI based on the association relationship, so that the terminal device obtains the RMSI.

According to a seventh aspect, an embodiment provides an information sending method, and the method may include sending, by a network device, RMSI to a terminal device on a PDSCH at a time point T1 by using a first beam and sending, by the network device, the RMSI to the terminal device on the PDSCH at a time point T2 by using a second beam, where a time interval between T2 and T1 is associated with a physical broadcast channel PBCH period.

In a possible implementation, the method further includes: sending, by the network device, indication information to the terminal device, where the indication information is used to indicate the PBCH period.

In this embodiment, an association relationship between a transmission time interval of different beams and the PBCH period is defined. In this way, when the terminal device learns of the PBCH period, the terminal device may further learn of sending times of the RMSI on different beams based on the association relationship, so that the terminal device obtains the RMSI.

According to an eighth aspect, an embodiment provides an information receiving method, and the method may include determining, by a terminal device based on a physical broadcast channel PBCH period, a first time point at which RMSI is to be received, where the RMSI is a system message that is received by the terminal device from a network device on a PDSCH at a time point T1 by using a first beam and received from the network device on the PDSCH at a time point T2 by using a second beam, the RMSI includes at least one of the following information: configuration information of a random access channel, configuration information of a paging channel, configuration information of a downlink shared channel, configuration information of an uplink shared channel, a public land mobile network identifier list, a tracking area code, cell barring access information, scheduling information of an open systems interconnection OSI or a system information block SIB, a system information value tag, bandwidth indication information, and cell reselection information, and a time interval between T2 and T1 is associated with the PBCH period; and receiving, by the terminal device, the RMSI based on the first time point.

In a possible implementation, the method further includes: receiving, by the terminal device, indication information sent by the network device, where the indication information is used to indicate the PBCH period.

According to a ninth aspect, this application provides an information sending apparatus, where the information sending apparatus has a function of implementing the method in any one of the foregoing information sending method embodiments. The function may be implemented by hardware, or may be implemented by hardware executing corresponding software. The hardware or software includes one or more modules corresponding to the foregoing function.

According to a tenth aspect, this application provides an information receiving apparatus, where the information receiving apparatus has a function of implementing the method in any one of the foregoing information receiving method embodiments. The function may be implemented by hardware, or may be implemented by hardware executing corresponding software. The hardware or software includes one or more modules corresponding to the foregoing function.

It may be understood that, when both the information sending apparatus and the information receiving apparatus are chips, a receiving unit may be an input unit, for example, an input circuit or a communications interface; and a sending unit may be an output unit, for example, an output circuit or a communications interface. When both the information sending apparatus and the information receiving apparatus are terminal devices, a receiving unit may be a receiver (which may be also referred to as a receiving machine); and a sending unit may be a transmitter (which may be also referred to as a transmitter).

According to an eleventh aspect, this application provides a network device, where the network device includes a processor, and the processor is configured with a corresponding function of supporting the network device in performing the information sending method provided in the first aspect, the second aspect, the third aspect, or the fourth aspect. The network device may further include a memory, where the memory is configured to couple with the processor, and stores a program instruction and data that are necessary for the network device. The network device may further include a communications interface. The communications interface is used by the network device to communicate with another device or a communications network.

According to a twelfth aspect, this application provides a terminal device, where the terminal device includes a processor, and the processor is configured with a corresponding function of supporting the terminal device in performing the information receiving method provided in the fifth aspect, the sixth aspect, the seventh aspect, or the eighth aspect. The terminal device may further include a memory, where the memory is configured to couple with the processor, and stores a program instruction and data that are necessary for the terminal device. The terminal device may further include a communications interface. The communications interface is used by the terminal device to communicate with another device or a communications network.

According to a thirteenth aspect, this application provides a computer storage medium, configured to store a computer software instruction used by the network device provided in the eleventh aspect. The computer software instruction includes a program designed for performing the foregoing aspects.

According to a fourteenth aspect, this application provides a computer storage medium, configured to store a computer software instruction used by the terminal device provided in the twelfth aspect. The computer software instruction includes a program designed for performing the foregoing aspects.

According to a fifteenth aspect, an embodiment provides a computer program, where the computer program includes an instruction, and when the computer program is executed by a computer, the computer is enabled to perform a process in the information sending method in any one of the first aspect, the second aspect, the third aspect, or the fourth aspect.

According to a sixteenth aspect, an embodiment provides a computer program, where the computer program includes an instruction, and when the computer program is executed by a computer, the computer is enabled to perform a process in the information receiving method in any one of the fifth aspect, the sixth aspect, the seventh aspect, or the eighth aspect.

According to a seventeenth aspect, this application provides a chip system, where the chip system includes a processor, configured to support a network device or a terminal device in implementing functions in the foregoing aspects, for example, generating or processing information in the foregoing methods. In a possible design, the chip system further includes a memory, where the memory is configured to store a program instruction and data that are necessary for a data sending device. The chip system may include a chip, or may include a chip and another discrete device.

According to another aspect, an information sending method is provided, including scheduling, by a network device, remaining minimum system information every X time period, where the RMSI is carried on a physical downlink shared channel PDSCH, the PDSCH is scheduled by using a physical downlink control channel PDCCH, and X time period is an RMSI period and repeatedly transmitting, by the network device, the RMSI in one transmission time interval TTI by using Y redundancy versions, and/or repeatedly transmitting the RMSI in Y data scrambling manners, where Y is an integer greater than or equal to 1, the transmission time interval is equal to X*Y, and X is an integer multiple of a synchronization signal block burst set SS block burst set period, or the transmission time interval is an integer multiple of a synchronization signal block burst set SS block burst set period.

In a possible implementation, the network device configures at least one of the transmission time interval TTI, the RMSI period X, the SS block burst set period, or a value of the integer multiple by using a physical broadcast channel PBCH.

In another possible implementation, the physical broadcast channel includes MIB information that may be carried in a physical broadcast channel demodulation reference signal PBCH DMRS or PBCH data.

In this embodiment, a problem of how the terminal device obtains the RMSI in NR can be effectively resolved in a manner of associating with the PBCH period or the SS block burst set period.

BRIEF DESCRIPTION OF THE DRAWINGS

To describe the technical solutions in embodiments of the present invention or in the background more clearly, the following describes the accompanying drawings required for describing the embodiments of the present invention or the background.

DETAILED DESCRIPTION OF ILLUSTRATIVE EMBODIMENTS

Figure 1:
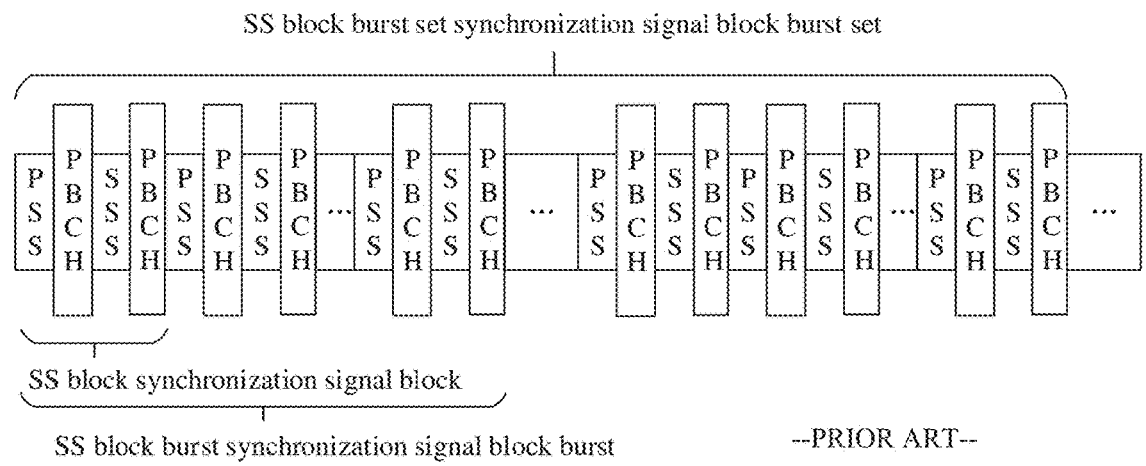
FIG. 1 is a schematic structural diagram of an SS block burst set according to this application.

The following describes the embodiments of the present invention with reference to the accompanying drawings in the embodiments of the present invention.

In the specification, claims, and accompanying drawings of this application, the terms "first", "second", "third", "fourth", and the like are intended to distinguish between different objects but do not indicate a particular order. In addition, the terms "including" and "having" and any other variants thereof are intended to cover non-exclusive inclusion. For example, processes, methods, systems, products, or devices that include a series of steps or units are not limited to the listed steps or units, but optionally further includes an unlisted step or unit, or optionally further includes another inherent step or unit of these processes, methods, products, or devices.

Mentioning an "embodiment" in this specification means that a particular characteristic, structure, or feature described with reference to the embodiment may be included in at least one embodiment of this application. The phrase appearing in various locations in this specification may not necessarily refer to a same embodiment, and is not an independent or optional embodiment exclusive from another embodiment. It is explicitly and implicitly understood by a person skilled in the art that the embodiments described in this specification may be combined with another embodiment.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer readable media that store various data structures. For example, the components may perform, by using a local and/or remote process, communication based on a signal having one or more data packets (for example, data from two components interacting with another component in a local system, a distributed system, and/or across a network such as the Internet interacting with other systems by using a signal).

The following describes some terms in this application, to facilitate understanding of a person skilled in the art.

Logical channel: The logical channel describes a type of information, to be specific, defining a specific type of to-be-transmitted information. An interface between a media access control (MAC) layer and a radio link control (RLC) layer is a logical channel. The MAC layer provides a service for the RLC layer through the logical channel.

Figure 2:
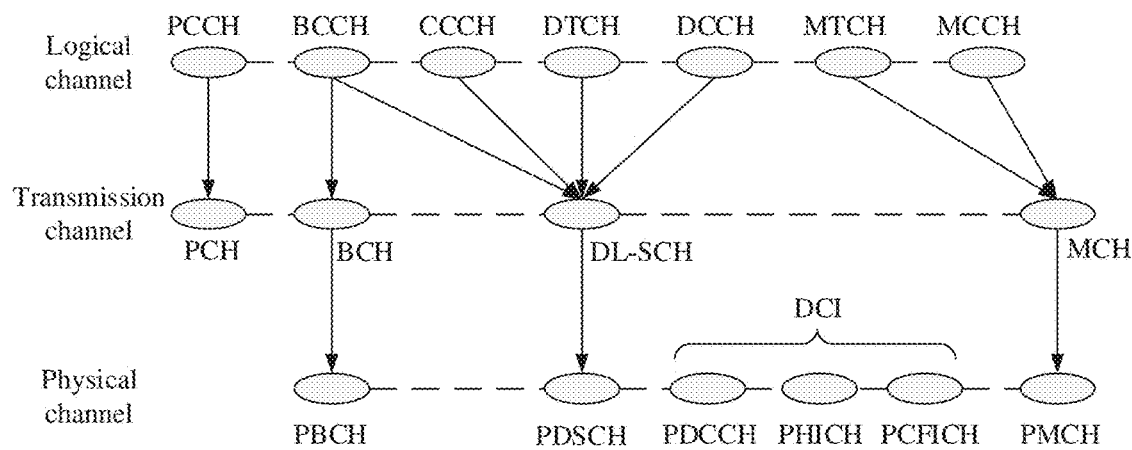
FIG. 2 is a schematic structural diagram of a channel according to an embodiment.

FIG. 2 is a schematic structural diagram of a channel according to an embodiment. Logical channels are classified into two types: a logical control channel and a logical traffic channel. The logical control channel is used to transmit control plane information, and may include a PCCH (Paging Control Channel), a CCCH (Common Control Channel), and a DCCH (Dedicated Control Channel). The logical traffic channel is used to transmit user plane information, and may include a DTCH (Dedicated Traffic Channel), and an MTCH (Multicast Traffic Channel).

(2) Transmission channel: The transmission channel describes a transmission mode of information, to be specific, defining how information is transmitted. An interface between a physical layer (PHY) and a media access control (MAC) layer is a transmission channel. The PHY layer provides a service for the MAC layer through the transmission channel. Transmission channels may be generally classified based on a manner in which a signal is transmitted on a radio interface, for example, a channel coding policy, a modulation method, and an antenna mapping manner.

As shown in FIG. 2, a transmission channel may include a DL-SCH (Downlink Shared Channel), a BCH (Broadcast Channel), an MCH (Multicast Channel), a PCH (Paging Channel), a UL-SCH (Uplink Shared Channel), and a RACH (Random Access Channel).

(3) Physical channel: The physical channel is used to transmit a specific signal at a physical layer. The physical channel corresponds to a set of resource elements (RE) that carry higher layer information. Basic entities included in the physical channel include a resource element (RE) and a resource block (RB).

As shown in FIG. 2, a physical channel may include a PDCCH (Physical Downlink Control Channel), a PDSCH (Physical Downlink Shared Channel), a PBCH (Physical Broadcast Channel), a PMCH (Physical Multicast Channel), a PHICH (Physical Hybrid ARQ Indicator Channel), a PCFICH (Physical Control Format Indicator Channel), a PUCCH (Physical Uplink Control Channel), a PUSCH (Physical Uplink Shared Channel), and a PRACH (Physical Random Access Channel).

First, a to-be-resolved technical problem and an application scenario in this application are proposed. In the prior art, before accessing a cell, a terminal device needs to first obtain system information of the cell, so as to know a configuration of the cell, so that the terminal device can correctly work in the cell. The cell sends the system information to all terminal devices in the cell through a logical channel BCCH. In the prior art, LTE system broadcast information (namely, a logical channel BCCH) is divided into a master information block (MIB) and a system information block (SIB). It can be learned from FIG. 2 that the logical channel BCCH is mapped to transmission channels BCH and DL-SCH. The BCH is only used to transmit MIB information, and is mapped to a fixed physical resource of a physical channel PBCH for transmission. The DL-SCH is used to transmit various SIB information, and is mapped to a physical channel PDSCH for scheduling transmission.

The master information block (MIB) information is basic configuration information of a system. For example, the MIB includes at least one type of the following information: downlink system bandwidth, a system frame number (SFN), PHICH indication information, antenna configuration information, and the like. The MIB information is carried on the BCCH→BCH→PBCH, where a PBCH period is 40 ms, same content is repeatedly transmitted (or a different redundancy version RV may be repeatedly transmitted) every 10 ms in one period, and transmission of the same content is fixed at a subframe 0 of each radio frame. A terminal needs to perform blind detection and demodulation. To be specific, the terminal may receive and demodulate the BCH at any one of the four times of blind detection and demodulation.

The system information block (SIB) includes a SIB 1 to a SIB 12. The SIB is carried on the BCCH→DL-SCH→PDSCH, where a PDSCH period is 80 ms, and same content is repeatedly transmitted every 20 ms in one period, and transmission of the same content is fixed at a subframe 5 of each radio frame.

The SIB 1 includes a PLMN ID, a cell global ID, a cell barring state, a cell selection parameter, and SI information.

The SIB 2 includes common radio resource configuration and uplink bandwidth.

The SIB 3 includes cell reselection information (serving cell information).

The SIB 4 includes neighboring cell information.
The SIB 5 includes neighboring cell information.
The SIB 6 includes neighboring cell information.
The SIB 7 includes neighboring cell information.
The SIB 8 includes neighboring cell information.
The SIB 9 includes an HeNB ID.
The SIB 10 includes ETWS primary notification information.
The SIB 11 includes ETWS secondary notification information.
The SIB 12 includes MBSFN area list information and MBSFN information.

In LTE, system information is formed by using system information blocks (SIB). Each SIB includes a parameter related to a function. The most basic and important system information used by UE to access a network is used as MSI (Minimum SI), and is sent through periodic broadcasting. The MSI further includes EMSI (for example, located in an SS block as described above and carried by using a PBCH) and RMSI. The RMSI is carried by using a PDSCH in some fixed slots (for example, one or more subframes/slots), and is scheduled by using a PDCCH. The EMSI and the RMSI are sent through periodic broadcasting, and may have different transmission periods. Currently, in new radio NR, MIB information on the PBCH and remaining minimum system information (RMSI) on the PDSCH jointly carry complete content of the minimum system information (MSI). Because a PBCH period (the PBCH period may also be referred to as an SS block burst set period in this application) is flexible, and beam scanning is used, overheads of broadcast information is determined based on a quantity of beams, an increased quantity of beams leads to increased overheads of the broadcast information, and an RMSI period may need to be increased to reduce the overheads. However, when the quantity of beams decreases, the overheads of the broadcast information may be reduced. Therefore, a relatively small RMSI period may be used to reduce an access time. In other words, if a manner in which a transmission period and a transmission time position of an SIB 1 are fixed in LTE is used, flexibility is poor, and the manner is not applicable to an NR application scenario.

However, for a terminal device in NR, after obtaining the MIB information, the terminal device further needs to obtain the RMSI, so as to obtain the complete MSI information, so that the terminal device may perform basic cell access. Therefore, correctly and effectively obtaining the MIB and the RMSI can improve efficiency of accessing a cell by the terminal device. Therefore, the to-be-resolved technical problem in this application is how to define an RMSI period in an NR system, so that the RMSI period can be more flexibly applicable to the NR application scenario and the terminal device can conveniently obtain the RMSI. The RMSI period may be a scheduling period of the RMSI. As shown in FIG. 9B, in the scheduling period of the RMSI, the RMSI may be repeatedly transmitted, or may not be repeatedly transmitted. Different repeated transmission may be performed in different scheduling manners, for example, repeated transmission performed by using different redundancy versions (RV) or in different scrambling manners, or repeated transmission performed by a base station based on a quantity of synchronization signal blocks (SS block), or repeated transmission performed by using different antenna ports, or repeated transmission performed by using different beams, or repeated transmission performed based on a purpose that the base station covers different areas. When the RMSI is repeatedly transmitted in a period, the scheduling period of the RMSI may also be referred to as a transmission time interval (TTI) period.

It should be understood that, the embodiments may be applied to a next generation communications system, for example, a 5G new radio (NR) system, which is referred to as a 5G NR system for short.

For ease of understanding of the embodiments, based on the foregoing descriptions, the following first describes an architecture of a communications system, where the embodiments are based on the architecture of the communications system.

Figure 3:
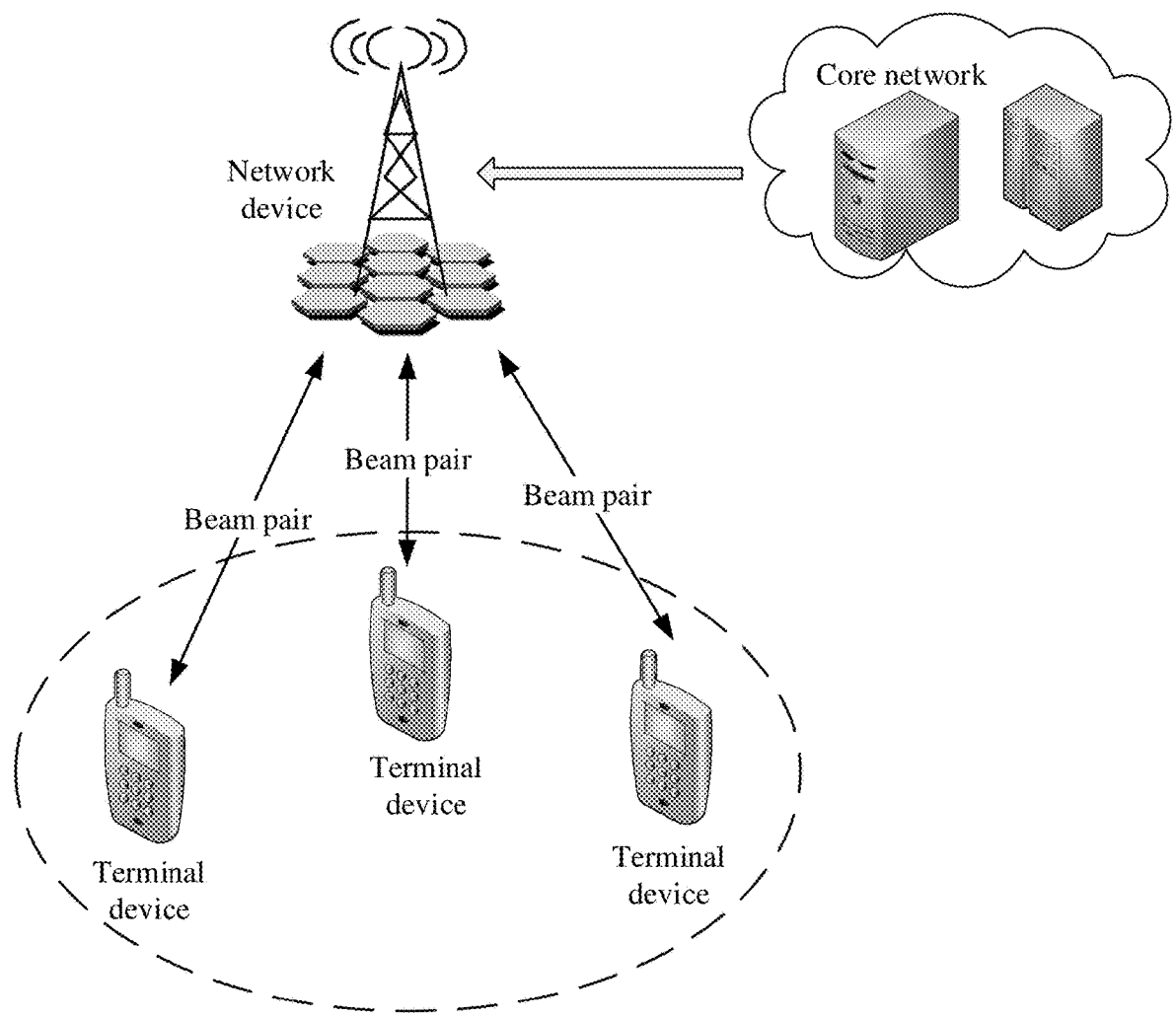
FIG. 3 is an architectural diagram of a communications system according to an embodiment.

FIG. 3 is an architectural diagram of a communications system according to an embodiment. The architecture of the communications system includes a core network, a network device, and a terminal device. As an example rather than a limitation, the core network provides a related service for an entire communication process, the network device indicates MIB information and RMSI for the accessed terminal device, and the terminal device performs cell access by using MSI information indicated by the network device.

The terminal device is a device that has a wireless transceiving function. The terminal device may be deployed on land, including an indoor, outdoor, handheld, wearable, or vehicle-mounted device; or may be deployed on a water surface (for example, on a steamboat); or may be deployed in the air (for example, on a plane, a balloon, or a satellite). The terminal device may be a mobile phone (mobile phone), a tablet computer (Pad), a computer with a wireless transceiving function, a virtual reality (VR) terminal device, an augmented reality (AR) terminal device, a wireless terminal in industrial control, a wireless terminal in self driving, a wireless terminal in remote medical, or a wireless terminal in smart grid, a wireless terminal in transportation safety, a wireless terminal in a smart city, a wireless terminal in a smart home, or the like. An application scenario is not limited in the embodiments of this application. The terminal device may also be sometimes referred to as user equipment (UE), an access terminal device, a UE unit, a UE station, a mobile station, a mobile console, a remote station, a remote terminal device, a mobile device, a UE terminal device, a terminal device, a wireless communications device, a UE proxy, a UE apparatus, or the like.

The network device may be a network element on a network side in a 5G communications system, for example, may be a gNB in the 5G communications system. Specifically, the network device supports determining, of a beam pair between the network device and the terminal device, which is performed by using a beam sweeping process, and monitors a plurality of beam pairs in a communication process, so as to improve robustness of a communication link. To improve coverage of the network device and ensure that the terminal device can quickly obtain a synchronization signal, system information, and the like that are required for accessing a network, the network device further supports periodic broadcasting of the information. It may be understood that because both the network device and the terminal device perform communication by using a relatively narrow analog beam, better communication quality is obtained only when an analog beam used for sending and an analog beam used for receiving are aligned. For more specific description, refer to descriptions in the following embodiment. In addition, various embodiments are described with reference to the network device in the embodiments. The network device may be a device, such as a network device, configured to communicate with a mobile device. The network device may be an access point (AP) in a WLAN, a relay node or an access point, a vehicle-mounted device, a wearable device, a network device (next generation NodeB, "gNB" or "gNodeB") in a future 5G network, a network device in a future evolved PLMN, or the like.

In addition, in this embodiment, the network device serves a cell, and the terminal device communicates with the network device by using a transmission resource (for example, a frequency domain resource or a spectrum resource) used by the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. These small cells are characterized by a small coverage area and a low transmit power, and are applicable to providing a high-rate data transmission service.

It may be understood that the architecture of the communications system in FIG. 3 is only an example implementation in the embodiments, and architectures of the communications system in the embodiments include but are not limited to the foregoing architecture of the communications system.

With reference to an embodiment of an information sending and receiving method provided in this application, the following specifically analyzes and resolves the technical problem proposed in this application.

Figure 4:
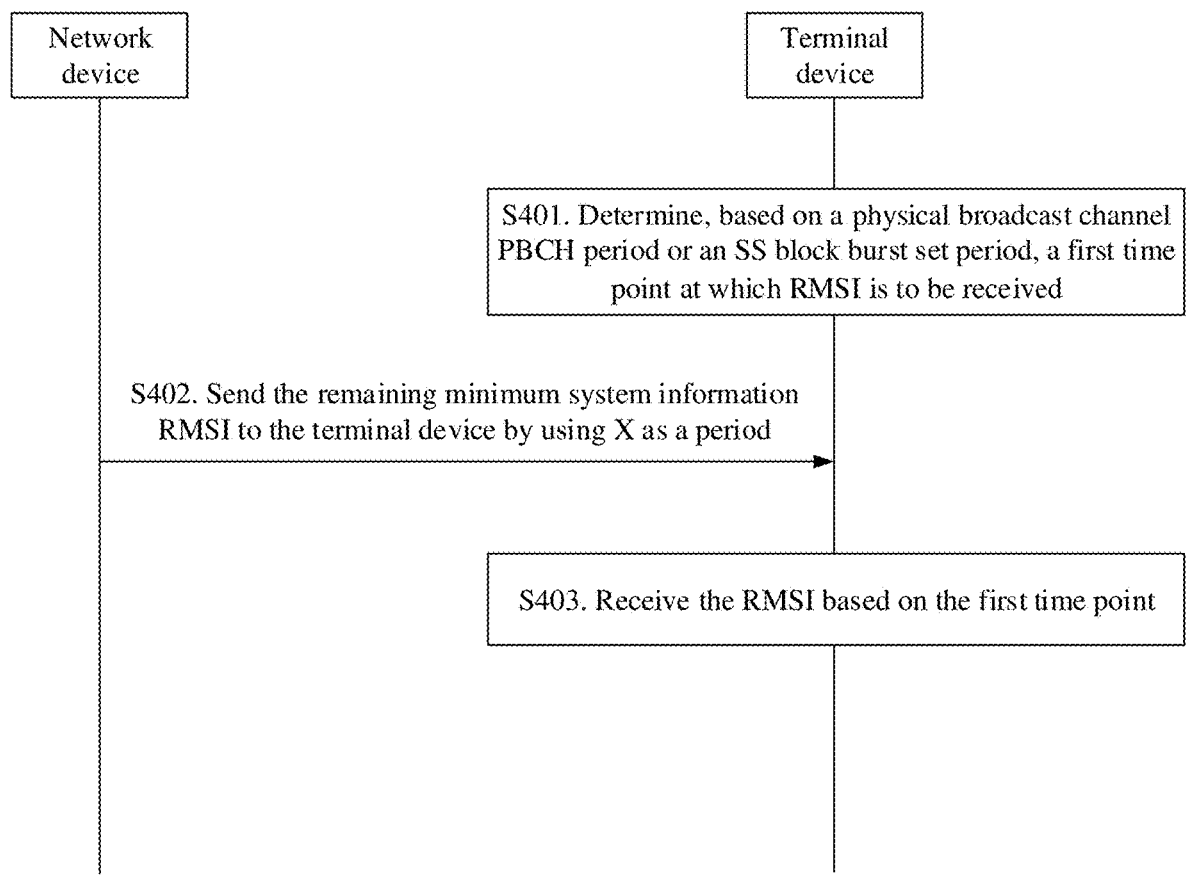
FIG. 4 is a schematic flowchart of an information sending and receiving method according to an embodiment.

FIG. 4 is a schematic flowchart of an information sending and receiving method according to an embodiment. The method may be applied to the communications system in FIG. 3. The following performs description from a perspective of an interaction between a network device and a terminal device with reference to FIG. 4. The method may include the following step S401 to step S403.

Step S401: The terminal device determines, based on a physical broadcast channel PBCH period or an SS block burst set period, a first time point at which RMSI is to be received, where the RMSI is RMSI sent by the network device to the terminal device by using X as a period, and X is a multiple of the PBCH period, or X and the PBCH period or the SS block burst set period are in a one-to-one correspondence or a one-to-many relationship, and in a process in which the RMSI is sent once, the network device sends at least one piece of RMSI by using at least one beam or antenna port.

Step S402: The network device sends the remaining minimum system information RMSI to the terminal device by using X as the period, where X is a multiple of the PBCH period or the SS block burst set period, or X and the PBCH period or the SS block burst set period are in a one-to-one correspondence or a one-to-many relationship, and in the process in which the RMSI is sent once, the network device sends the at least one piece of RMSI by using the at least one beam or antenna port.

Step S403: The terminal device receives the RMSI based on the first time point.

Specifically, sending the RMSI in this application refers to sending the RMSI once. In the process in which the RMSI is sent once, the network device sends the at least one piece of RMSI by using the at least one beam or antenna port.

For example, the network device schedules the RMSI once every X time by using L (greater than or equal to 1) beams or antenna ports, where the RMSI is carried by a physical downlink shared channel PDSCH, the PDSCH is scheduled by using a physical downlink control channel PDCCH, and the X time may be understood as an RMSI period.

For another example, the network device repeatedly transmits the RMSI by using different RVs and/or repeatedly transmits the RMSI in different data scrambling manners every X time, where a quantity of repetition times is less than or equal to M, M is an integer greater than or equal to 1, and M*X is a scheduling period of the RMSI (which may also be referred to as a repetition rate).

In a possible implementation, a beam/port used to send the RMSI is a beam/port of an SS block, and a quantity of beams/ports used to send the RMSI may be less than or equal to a quantity of beams/ports of the SS block).

In a possible implementation, the antenna port used to transmit the RMSI and the SS block are in a quasi co-located QCL relationship.

It may be understood that, in actual application, N beams used by the network device may be the same as or quasi co-located (QCL) with transmit beams of SS blocks included in a synchronization signal block set SS block burst set, where QCL parameters include at least one of the following items: an average gain, an average delay, a delay spread, a Doppler shift, a Doppler spread, and a Spatial Tx/Rx parameter. The spatial Tx/Rx parameter includes an angle of arrival (AoA)/angle of departure (AoD), a dominant AoA/AoD, an average AoA/AoD, a power angular spectrum (PAS) of AoA/AoD, transmit/receive channel correlation, transmit/receive beamforming, spatial channel correlation, and the like.

In a possible implementation, the RMSI may include one or more of configuration information of a random access channel, configuration information of a paging channel, configuration information of a downlink shared channel, configuration information of an uplink shared channel, a public land mobile network identity list PLMN-Identity List, a tracking area code, cell barring access information, scheduling information of other system information OSI, scheduling information of a system information block SIB 1, a system information value tag (SI Value Tag), bandwidth indication information, and cell reselection information.

In a possible implementation, the network device or the terminal device may pre-store information about an association relationship (for example, an integral multiple or a fractional multiple relationship) between the PBCH period or the SS block burst set period and the RMSI period (namely, the X time). In addition, because the terminal device obtains MIB information before obtaining the RMSI, the terminal device may first learn of the PBCH period or the SS block burst set period by using the MIB information, and then finally determine the RMSI period based on the information about the relationship between the RMSI period and the PBCH period.

In another possible implementation, the information about the association relationship between the PBCH period or the SS block burst set period and the RMSI period (namely, the X time) may further be sent by the network device to the terminal device.

In another possible implementation, the network device may further send indication information to the terminal device, where the indication information is used to indicate the PBCH period or the SS block burst set period. Specifically, the network device may indicate the PBCH period or the SS block burst set period to the terminal device in the MIB information on a PBCH in an explicit or implicit manner. In this case, the indication information may be the MIB information. After receiving the MIB information on the PBCH, the terminal device may learn of the PBCH period, and then determine, based on the pre-specified association relationship (for example, a multiple relationship) between the PBCH period and the RMSI period, the first time point at which the RMSI is to be received.

It may be understood that the network device may also add the indication information to information on the PBCH or another channel. This is not specifically limited in this application. It may be further understood that, because the RMSI on the PDSCH is a periodically broadcast system message, the first time point may be one time point, or may be a plurality of periodic time points. For example, the first time point is a $5^{th}$ ms, a $10^{th}$ ms, a $15^{th}$ ms, or the like.

For the foregoing step S402, the network device side may send the RMSI to the terminal device on the physical downlink shared channel PDSCH every X time based on the preconfigured or pre-stored information about the association relationship between the PBCH period and the RMSI period. For example, the network device sends the RMSI to the terminal device every X time through PDSCH, where X is equal to 5 ms, 10 ms, 20 ms, 40 ms, 80 ms, or 160 ms.

For the foregoing step S403, after determining the first time point based on the association relationship between the PBCH period and the RMSI period, the terminal device monitors the RMSI on the PDSCH at the first time point (which may be one time point or a plurality of time points).

In this embodiment, it is proposed that the RMSI period is related to the PBCH period. Therefore, the RMSI period and the PBCH period may be both learned provided that any one of the periods is notified or indicated, thereby saving overheads and simplifying an indication process. The following describes how to specify the association relationship between the PBCH period and the RMSI period in this application.

In a possible implementation, X is a multiple of the PBCH period or the SS block burst set period, and there may specifically be an integer multiple relationship or a fractional multiple relationship between X and the PBCH period or the SS block burst set period. The following performs description by using Manner 1 and Manner 2 as examples.

Manner 1: In Manner 1, the RMSI period is N times the SS block burst set period or the PBCH period, where N is greater than 0, $N=2^n$, and n is an integer. In other words, the RMSI period and the PBCH period may be in a simple multiple relationship. A specific implementation may be as follows:

1. The RMSI period is N times the PBCH period or the SS block burst set period. There may be only one value of N, to be specific, regardless of the PBCH period, the RMSI period is a fixed multiple of the PBCH period, for example, N=2.

2. The network device indicates the PBCH period or the SS block burst set period by using the MIB information on the PBCH. For example, the PBCH period or the SS block burst set period may be 5 ms, 10 ms, 20 ms, 40 ms, 80 ms, or 160 ms.

3. After receiving the MIB information added by the network device to the PBCH, the terminal device learns of the PBCH period or the SS block burst set period, and may determine, based on information that is about the relationship between the PBCH period and the RMSI period and that is pre-stored based on a protocol or received from the network device, the period in which the RMSI is to be received, to be specific, the first time point at which the RMSI is to be received. Details are shown in the following Table 1.

TABLE 1

| PBCH period (or SS block burst set period) | RMSI period (X time) | Association relationship |
| --- | --- | --- |
| 5 ms | 10 ms | 2 times |
| 10 ms | 20 ms | 2 times |
| 20 ms | 40 ms | 2 times |
| 40 ms | 80 ms | 2 times |
| 80 ms | 160 ms | 2 times |
| 160 ms | 320 ms | 2 times |
| ... | ... | ... |

Manner 2: In Manner 2, the RMSI period is N times the SS block burst set period or the PBCH period, where N is greater than 0, $N=2^n$, and n is a positive integer and/or a negative integer. In other words, the RMSI period and the PBCH period or the SS block burst set period are still in a multiple relationship, but the multiple relationship may change with the PBCH period. A specific implementation may be as follows:

1. The RMSI period is N times the PBCH period or the SS block burst set period. There may be a plurality of values of N. In other words, a corresponding value of N may vary with the PBCH period. For example, when the PBCH period is 5 ms, 10 ms, or 20 ms, N=4, to be specific, the RMSI period is always four times the PBCH period. When the PBCH period or the SS block burst set period is 40 ms, 80 ms, or 160 ms, N=2, to be specific, the RMSI period is always twice the PBCH period or the SS block burst set period.

2. The network device indicates the PBCH period or the SS block burst set period by using the MIB information on the PBCH. For example, the PBCH period may be 5 ms, 10 ms, 20 ms, 40 ms, 80 ms, or 160 ms.

3. After receiving the MIB information added by the network device to the PBCH, the terminal device learns of the PBCH period or the SS block burst set period, and may determine, based on information that is about the relationship between the PBCH period and the RMSI period and that is pre-stored based on a protocol or received from the network device, the period in which the RMSI is to be received, to be specific, the first time point at which the RMSI is to be received. Details are shown in the following Table 2.

TABLE 2

| PBCH period (or SS block burst set period) | RMSI period (X time) | Association relationship |
| --- | --- | --- |
| 5 ms | 20 ms | 4 times |
| 10 ms | 40 ms | 4 times |
| 20 ms | 80 ms | 4 times |
| 40 ms | 80 ms | 2 times |
| 80 ms | 160 ms | 2 times |
| 160 ms | 320 ms | 2 times |
| ... | ... | ... |

Certainly, it may be understood that values of the PBCH period and the RMSI period may also be directly specified, for example, the values are shown in the following Table 3.

TABLE 3

| PBCH period (or SS block burst set period) | RMSI period (X time) | Association relationship |
| --- | --- | --- |
| 5 ms | 40 ms | None |
| 10 ms | 40 ms | None |
| 20 ms | 40 ms | None |
| 40 ms | 40 ms | None |
| 80 ms | 40 ms | None |
| 160 ms | 40 ms | None |
| ... | ... | ... |

In a possible implementation, X and the PBCH period or the SS block burst set period are in a one-to-one correspondence or a one-to-many relationship. The following performs description by using Manner 3 and Manner 4 as examples.

Manner 3: In Manner 3, a table of a mapping relationship between the RMSI period and the PBCH period or the SS block burst set period is preconfigured. The RMSI period and the PBCH period may be in a one-to-one correspondence, and a specific implementation may be as follows:

1. A direct mapping relationship between the RMSI period and the PBCH period or the SS block burst set period may be a one-to-one mapping relationship. For example, in the one-to-one relationship, when the PBCH period is 5 ms, the RMSI period is 10 ms, or when the PBCH period is 10 ms, the RMSI period is 20 ms.

2. The network device indicates the PBCH period or the SS block burst set period by using the MIB information on the PBCH. For example, the PBCH period may be 5 ms, 10 ms, 20 MS, 40 ms, 80 ms, or 160 ms.

3. After receiving the MIB information added by the network device to the PBCH, the terminal device learns of the PBCH period or the SS block burst set period, and may determine, based on information that is about the relationship between the PBCH period and the RMSI period and that is pre-stored based on a protocol or received from the network device, the period in which the RMSI is to be received, to be specific, the first time point at which the RMSI is to be received. Alternatively, the terminal device determines the PBCH period based on the RMSI period. Details are shown in the following Table 4.

Table 4

| PBCH period (or SS block burst set period) | RMSI period (X time) | Association relationship |
| --- | --- | --- |
| 5 ms | 10 ms | One-to-one correspondence |
| 10 ms | 20 ms | One-to-one correspondence |
| 20 ms | 30 ms | One-to-one correspondence |
| 40 ms | 40 ms | One-to-one correspondence |
| 80 ms | 60 ms | One-to-one correspondence |
| 160 ms | 80 ms | One-to-one correspondence |

Manner 4: In Manner 4, a table of a mapping relationship between the RMSI period and the PBCH period or the SS block burst set period is preconfigured. The PBCH period and the RMSI period may be in a one-to-many relationship, and a specific implementation may be as follows:

1. The PBCH period or the SS block burst set period and the RMSI period are in a one-to-many mapping relationship. For example, in the one-to-many relationship, when the PBCH period is 5 ms or 10 ms, the RMSI period is 20 ms; when the PBCH period is 20 ms or 40 ms, the RMSI period is 80 ms; or when the PBCH period is 80 ms or 160 ms, the RMSI period is 160 ms.

2. The network device indicates the PBCH period or the SS block burst set period by using the MIB information on the PBCH. For example, the PBCH period may be 5 ms, 10 ms, 20 MS, 40 ms, 80 ms, or 160 ms.

3. After receiving the MIB information added by the network device to the PBCH, the terminal device learns of the PBCH period or the SS block burst set period, and may determine, based on information that is about the relationship between the PBCH period and the RMSI period and that is pre-stored based on a protocol or received from the network device, the period in which the RMSI is to be received, to be specific, the first time point at which the RMSI is to be received. Details are shown in the following Table 5.

Table 5

| PBCH period (or SS block burst set period) | RMSI period (X time) | Association relationship |
| --- | --- | --- |
| 5 ms<br>10 ms | 20 ms | One-to-many mapping relationship |
| 20 ms<br>40 ms | 80 ms | One-to-many mapping relationship |
| 80 ms<br>160 ms | 160 ms | One-to-many mapping relationship |
| ... | ... | ... |

Figure 5:
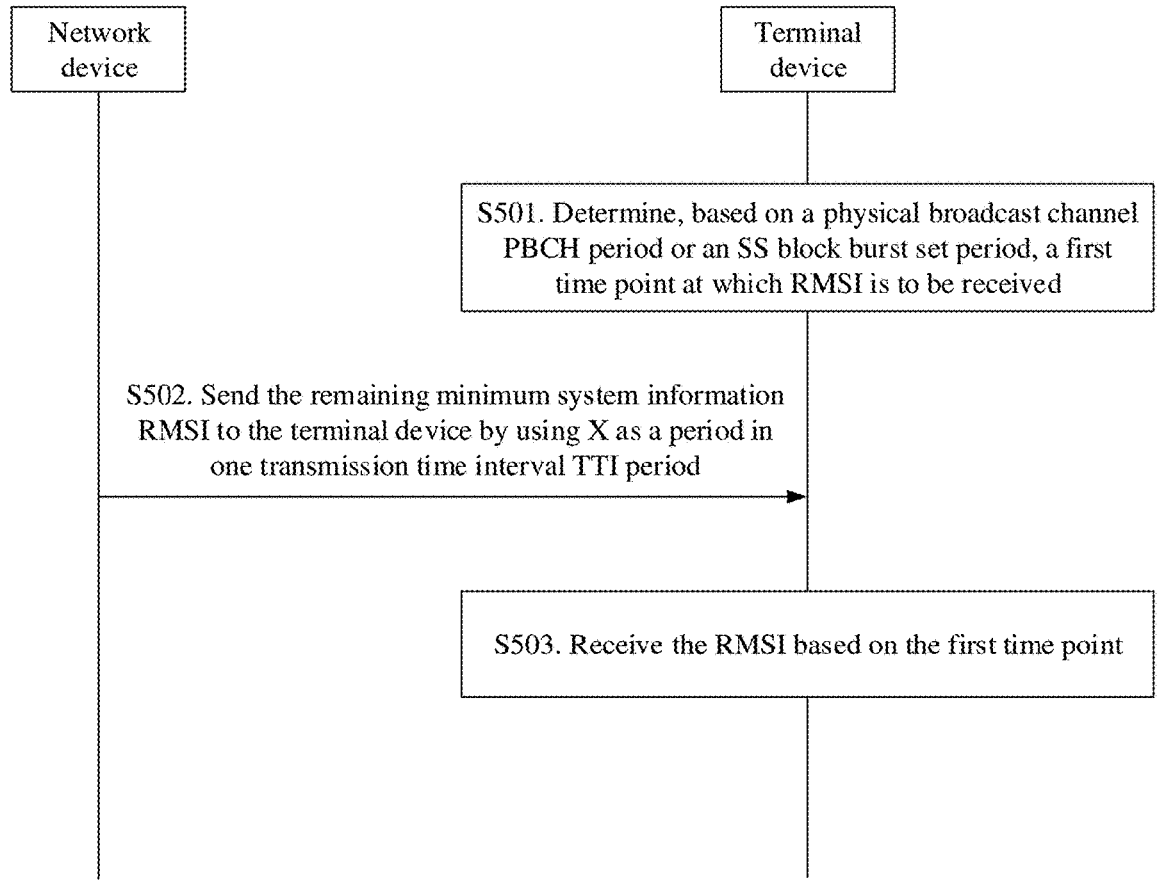
FIG. 5 is a schematic flowchart of another information sending and receiving method according to an embodiment.

FIG. 5 is a schematic flowchart of another information sending and receiving method according to an embodiment. The method may be applied to the communications system in FIG. 3. The following performs description from a perspective of an interaction between a network device and a terminal device with reference to FIG. 5. The method may include the following step S501 to step S503.

Step S501: The terminal device determines, based on a physical broadcast channel PBCH period or an SS block burst set period, a first time point at which RMSI is to be received.

Step S502: The network device sends the remaining minimum system information RMSI to the terminal device by using X as a period in one transmission time interval TTI period.

Step S503: The terminal device receives the RMSI based on the first time point.

Specifically, for descriptions of step S501 and step S503, refer to related descriptions of step S401 and step S403 corresponding to FIG. 4. Details are not described herein again.

A difference between step S502 and step S402 corresponding to FIG. 4 lies in that, in step S402 corresponding to FIG. 4, there is no concept of a TTI, in other words, there is no repeated transmission of the RMSI. In this embodiment, the TTI period of the RMSI is a scheduling period of the RMSI. In the scheduling period of the RMSI, the RMSI may be repeatedly transmitted, or may not be repeatedly transmitted. Different repeated transmission may be performed in different scheduling manners, for example, repeated transmission performed by using different RVs or in different scrambling manners, or repeated transmission performed by a base station based on a quantity of SS blocks. When the RMSI is repeatedly transmitted in a period by using different RVs or in different scrambling manners, the scheduling period of the RMSI may also be referred to as the TTI period of the RMSI. In one TTI, the network device repeatedly transmits the RMSI every X time, where the RMSI is repeatedly transmitted a plurality of times. Therefore, the terminal device needs to know a specific period of repeated transmission and a quantity of times of repeated transmission of the RMSI, so as to receive the RMSI at a correct first time point.

Figure 6:
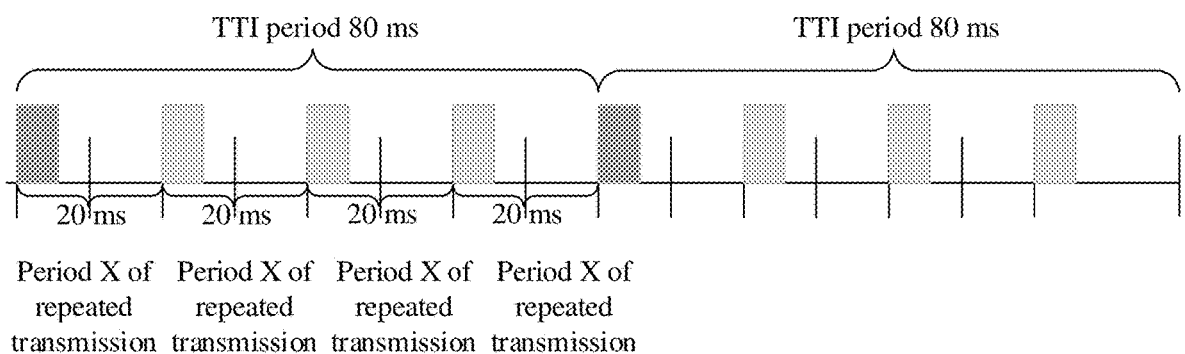
FIG. 6 is a schematic diagram of repeatedly transmitting RMSI in a TTI according to an embodiment.

FIG. 6 is a schematic diagram of repeatedly transmitting RMSI in a TTI according to an embodiment. In FIG. 6, assuming that a TTI period is 80 ms, and RMSI is repeatedly transmitted four times in one TTI period, in the TTI period, the RMSI is repeatedly transmitted on a PDSCH every 20 ms. After one TTI, new RMSI is repeatedly transmitted. The following performs description by using two types of association modes.

In a first type of association mode, in this embodiment, it is proposed that the TTI period is a preset value, and X is associated with the PBCH period. To be specific, the network device and the terminal device agree on that the TTI is a fixed period, and then agree on an association relationship between a period X and the PBCH period or the SS block burst set period, where the period X is a period in which the repeated RMSI is to be transmitted in one TTI. In this case, the terminal device may determine the first time point at which the RMSI is to be received each time, provided that the terminal device learns of the PBCH period. The following describes how to specify an association relationship between X and the PBCH period in this application.

In a possible implementation, X is a multiple of the PBCH period or the SS block burst set period, and there may specifically be an integer multiple relationship or a fractional multiple relationship between X and the PBCH period or the SS block burst set period. The following performs description by using Manner 5 as an example.

Manner 5: In Manner 5, the TTI period of the RMSI, namely, the scheduling period of the RMSI, is a preset value, to be specific, a preset fixed value, for example, 160 ms or 80 ms, and the association relationship between the transmission period X and the PBCH period or the SS block burst set period is a multiple relationship, where the transmission period X is a period in which the repeated RMSI is to be transmitted in the TTI period. A specific implementation may be as follows:

1. The TTI period of the RMSI is fixed. X is N times the PBCH period or the SS block burst set period. For example, the TTI is fixed at 160 ms, and a value of N is fixed at 1. When the PBCH period is 5 ms, and N=1, X=5 ms, and a quantity of times of repeated transmission is 32. When the PBCH period is 20 ms, and N=1, X=20 ms, and a quantity of times of repeated transmission is 8, in other words, X is always equal to the PBCH period. It may be understood that the value of N may also change with the PBCH period. This is not described herein by using an example.

2. The network device indicates the PBCH period, the SS block burst set period, or the RMSI period by using MIB information on a PBCH. For example, the PBCH period may be 5 ms, 10 ms, 20 ms, 40 ms, 80 ms, or 160 ms.

3. After receiving the MIB information added by the network device to the PBCH, the terminal device learns of the PBCH period, and may determine, based on information that is about the relationship between the PBCH period and X and that is pre-stored based on a protocol or received from the network device, the first time point at which the RMSI is to be received. Alternatively, the terminal device may also directly obtain the RMSI period, and obtain the PBCH period based on the RMSI period. Details are shown in the following Table 6.

TABLE 6

| PBCH period (or SS block burst set period) | TTI period | A quantity of times of repeated transmission | Period X of repeated transmission | Association relationship |
|---|---|---|---|---|
| 5 ms | 160 ms | 32 | 5 ms | X is one time the PBCH period |
| 10 ms | | 16 | 10 ms | X is one time the PBCH period |
| 20 ms | | 8 | 20 ms | X is one time the PBCH period |
| 40 ms | | 4 | 40 ms | X is one time the PBCH period |
| 80 ms | | 2 | 80 ms | X is one time the PBCH period |
| 160 ms | | 1 | 160 ms | X is one time the PBCH period |
| . . . | | . . . | . . . | . . . |

In a possible implementation, X and the PBCH period are in a one-to-one correspondence. The following performs description by using Manner 6 as an example.

Manner 6: In Manner 6, the TTI period is a preset value, to be specific, a preset fixed value, for example, 160 ms or 80 ms, and the association relationship between the transmission period X and the PBCH period or the SS block burst set period is a one-to-one correspondence, where the transmission period X is a period in which the repeated RMSI is to be transmitted in the TTI period. A specific implementation may be as follows:

The TTI period is fixed. A direct mapping relationship between the period of repeated transmission and the PBCH period or the SS block burst set period may be a one-to-one mapping relationship, where the period of repeated transmission is a period in which the repeated RMSI is to be transmitted in one TTI. For example, TTI=160 ms, and in the one-to-one relationship, when the PBCH period is 5 ms, X=10 ms, or when the PBCH period is 10 ms, X=20 ms.

2. The network device indicates the PBCH period, the SS block burst set period, or the RMSI period by using MIB information on a PBCH. For example, the PBCH period may be 5 ms, 10 ms, 20 ms, 40 ms, 80 ms, or 160 ms.

3. After receiving the MIB information added by the network device to the PBCH, the terminal device learns of the PBCH period, and may determine, based on information that is about the relationship between the PBCH period or the SS block burst set period and the RMSI period and that is pre-stored based on a protocol or received from the network device, the period in which the RMSI is to be received, to be specific, the first time point at which the RMSI is to be received, and information about the PBCH period. Details are shown in the following Table 7.

TABLE 7

| PBCH period (or SS block burst set period) | TTI period | A quantity of times of repeated transmission | Period X of repeated transmission | Association relationship |
| --- | --- | --- | --- | --- |
| 5 ms | 160 ms | 16 | 10 ms | One-to-one correspondence |
| 10 ms | | 8 | 20 ms | One-to-one correspondence |
| 20 ms | | 5 | 32 ms | One-to-one correspondence |
| 40 ms | | 4 | 40 ms | One-to-one correspondence |
| 80 ms | | 2 | 80 ms | One-to-one correspondence |
| 160 ms | | 1 | 160 ms | One-to-one correspondence |
| . . . | . . . | . . . | . . . | . . . |

In a possible implementation, X and the PBCH period or the SS block burst set period are in a one-to-many relationship. The following performs description by using Manner 7 as an example.

Manner 7: In Manner 7, the TTI period is a preset value, to be specific, a preset fixed value, for example, 160 ms or 80 ms, and the association relationship between the transmission period X and the PBCH period or the SS block burst set period is a one-to-many correspondence, where the transmission period X is a period in which the repeated RMSI is to be transmitted in the TTI period. A specific implementation may be as follows:

1. The TTI period is fixed. A direct mapping relationship between the period of repeated transmission and the PBCH period or the SS block burst set period may be a one-to-many mapping relationship, where the period of repeated transmission is a period in which the repeated RMSI is to be transmitted in one TTI. For example, in the one-to-many relationship, when the PBCH period is 5 ms and 10 ms, X=40 ms, or when the PBCH period is 20 ms and 40 ms, X=20 ms.

2. The network device indicates the PBCH period or the SS block burst set period by using MIB information on a PBCH. For example, the PBCH period may be 5 ms, 10 ms, 20 ms, 40 ms, 80 ms, or 160 ms.

3. After receiving the MIB information added by the network device to the PBCH, the terminal device learns of the PBCH period or the SS block burst set period or the RMSI period, and may determine, based on information that is about the relationship between the PBCH period and the RMSI period and that is pre-stored based on a protocol or received from the network device, the period in which the RMSI is to be received, to be specific, the first time point at which the RMSI is to be received, or the PBCH period. Details are shown in the following Table 8.

TABLE 8

| PBCH period (or SS block burst set period) | TTI period | A quantity of times of repeated transmission | Period X of repeated transmission | Association relationship |
| --- | --- | --- | --- | --- |
| 5 ms 10 ms | 80 ms | 2 | 40 ms | One-to-many correspondence |
| 20 ms 40 ms | | 4 | 20 ms | One-to-many correspondence |
| 80 ms 160 ms | | 8 | 10 ms | One-to-many correspondence |
| . . . | . . . | . . . | . . . |

In a second type of association mode, in this embodiment, it is proposed that X is a preset value, and the TTI period is associated with the PBCH period. To be specific, the network device and the terminal device agree on that a period, of repeated transmission, in which the repeated RMSI is to be transmitted in one TTI is fixed, and then agree on an association relationship between one TTI period and the PBCH period. In this case, the terminal device may simultaneously determine the RMSI period or information about the PBCH period and the first time point at which the RMSI is to be received each time, provided that the terminal learns of any one of the PBCH period and the RMSI period. The following describes how to specify an association relationship between the TTI period and the PBCH period in this application.

In a possible implementation, the TTI period is a multiple of the PBCH period, and there may specifically be an integer multiple relationship or a fractional multiple relationship between the TTI period and the PBCH period. The following performs description by using Manner 8 as an example.

Manner 8: In Manner 8, the period X, of repeated transmission, in which the repeated RMSI is to be transmitted in one TTI is a preset value, to be specific, a preset fixed value, and the association relationship between the TTI period and the PBCH period or the SS block burst set period is a multiple relationship. A specific implementation may be as follows:

1. X is fixed, and the TTI period is N times the PBCH period or the SS block burst set period. For example, X is fixed at 10 ms, and a value of N is fixed at 4. When the PBCH period or the SS block burst set period is 5 ms, X=10 ms, and N=4, TTI=20 ms, and a quantity of times of repeated transmission is 2. When the PBCH period is 20 ms, X=10 ms, and N=4, TTI=80 ms, and a quantity of times of repeated transmission is 8, in other words, the TTI is always four times the PBCH period. It may be understood that the value of N may also change with the PBCH period. This is not described herein by using an example.

2. The network device indicates the PBCH period, the SS block burst set period, or the RMSI period by using MIB information on the PBCH.

3. After receiving the MIB information added by the network device to the PBCH, the terminal device learns of the PBCH period or the SS block burst set period, and may simultaneously determine, based on information that is about the relationship between the PBCH period and X and that is pre-stored based on a protocol or received from the network device, the period in which the RMSI is to be received, to be specific, the first time point at which the RMSI is to be received, and information about the PBCH period. Details are not shown in the following Table 9.

TABLE 9

| PBCH period (or SS block burst set period) | TTI period | A quantity of times of repeated transmission | Transmission period X | Association relationship |
|---|---|---|---|---|
| 5 ms | 20 ms | 2 | 10 ms | TTI period is four times the PBCH period |
| 10 ms | 40 ms | 4 | 10 ms | TTI period is four times the PBCH period |
| 20 ms | 80 ms | 8 | 10 ms | TTI period is four times the PBCH period |
| 40 ms | 160 ms | 16 | 10 ms | TTI period is four times the PBCH period |
| 80 ms | 320 ms | 32 | 10 ms | TTI period is four times the PBCH period |
| 160 ms | 640 ms | 64 | 10 ms | TTI period is four times the PBCH period |
| ... | ... | ... | ... | ... |

In a possible implementation, the TTI period and the PBCH period are in a one-to-one correspondence. The following performs description by using Manner 9 as an example.

Manner 9: In Manner 9, the period X, of repeated transmission, in which the repeated RMSI is to be transmitted in one TTI is a preset value, to be specific, a preset fixed value, and the association relationship between the TTI period and the PBCH period or the SS block burst set period is a one-to-one correspondence. A specific implementation may be as follows:

1. X is fixed, and a direct mapping relationship between the TTI period and the PBCH period or the SS block burst set period may be a one-to-one mapping relationship. For example, X is fixed at 10 ms, in the one-to-one relationship, when the PBCH period or the SS block burst set period is 5 ms, TTI=20 ms, and a quantity of times of repeated transmission is 2; or when the PBCH period is 20 ms, TTI=40 ms, and a quantity of times of repeated transmission is 4.

2. The network device indicates the PBCH period, the SS block burst set period, or the TTI period by using MIB information on a PBCH. For example, the PBCH period may be 5 ms, 10 ms, 20 ms, 40 ms, 80 ms, or 160 ms.

3. After receiving the MIB information added by the network device to the PBCH, the terminal device learns of the PBCH period or the SS block burst set period or information about the TTI period of the RMSI, and may determine, based on information that is about a relationship between the PBCH period and the RMSI period and that is pre-stored based on a protocol or received from the network device, the information about the TTI period in which the RMSI is to be received. Details are shown in the following Table 10.

TABLE 10

| PBCH period (or SS block burst set period) | TTI period | A quantity of times of repeated transmission | Transmission period X | Association relationship |
|---|---|---|---|---|
| 5 ms | 20 ms | 2 | 10 ms | One-to-one correspondence |
| 10 ms | 30 ms | 3 | | One-to-one correspondence |
| 20 ms | 40 ms | 4 | | One-to-one correspondence |
| 40 ms | 50 ms | 5 | | One-to-one correspondence |
| 80 ms | 60 ms | 6 | | One-to-one correspondence |
| 160 ms | 70 ms | 7 | | One-to-one correspondence |
| ... | ... | ... | | ... |

In a possible implementation, the TTI period and the PBCH period are in a one-to-many relationship. The following performs description by using Manner 10 as an example.

Manner 10: In Manner 10, X is a preset value, to be specific, a preset fixed value, and the association relationship between the TTI period and the PBCH period or the SS block burst set period is a one-to-many correspondence, where the transmission period X is a period in which the repeated RMSI is to be transmitted in the TTI period. A specific implementation may be as follows:

1. A value of X is fixed, and it is specified that a correspondence between the TTI period and the PBCH period or the SS block burst set period may be a one-to-many correspondence. For example, X is fixed at 10 ms, in the one-to-many relationship, when the PBCH period is 5 ms and 10 ms, TTI=20 ms, and a quantity of times of repeated transmission is 2; or when the PBCH period is 20 ms and 40 ms, TTI=40 ms, and a quantity of times of repeated transmission is 4.

2. The network device indicates the PBCH period, the SS block burst set period, or information about the RMSI period by using MIB information on the PBCH. For example, the PBCH period may be 5 ms, 10 ms, 20 ms, 40 ms, 80 ms, or 160 ms.

3. After receiving the MIB information added by the network device to the PBCH, the terminal device learns of information about the PBCH period or information about the RMSI period, and may simultaneously determine, based on information that is about a relationship between the PBCH period or the SS block burst set period and the RMSI period and that is pre-stored based on a protocol or received from the network device, some or all information about the period in which the RMSI is to be received, or some or all of information about the PBCH period. The relationship is shown in the following Table 11.

TABLE 11

| PBCH period (or SS block burst set period) | TTI period | A quantity of times of repeated transmission | Period X of repeated transmission | Association relationship |
|---|---|---|---|---|
| 5 ms 10 ms | 20 ms | 2 | 10 ms | One-to-many correspondence |
| 20 ms 40 ms | 40 ms | 4 | | One-to-many correspondence |
| 80 ms 160 ms | 80 ms | 8 | | One-to-many correspondence |
| ... | ... | ... | | ... |

Figure 7:
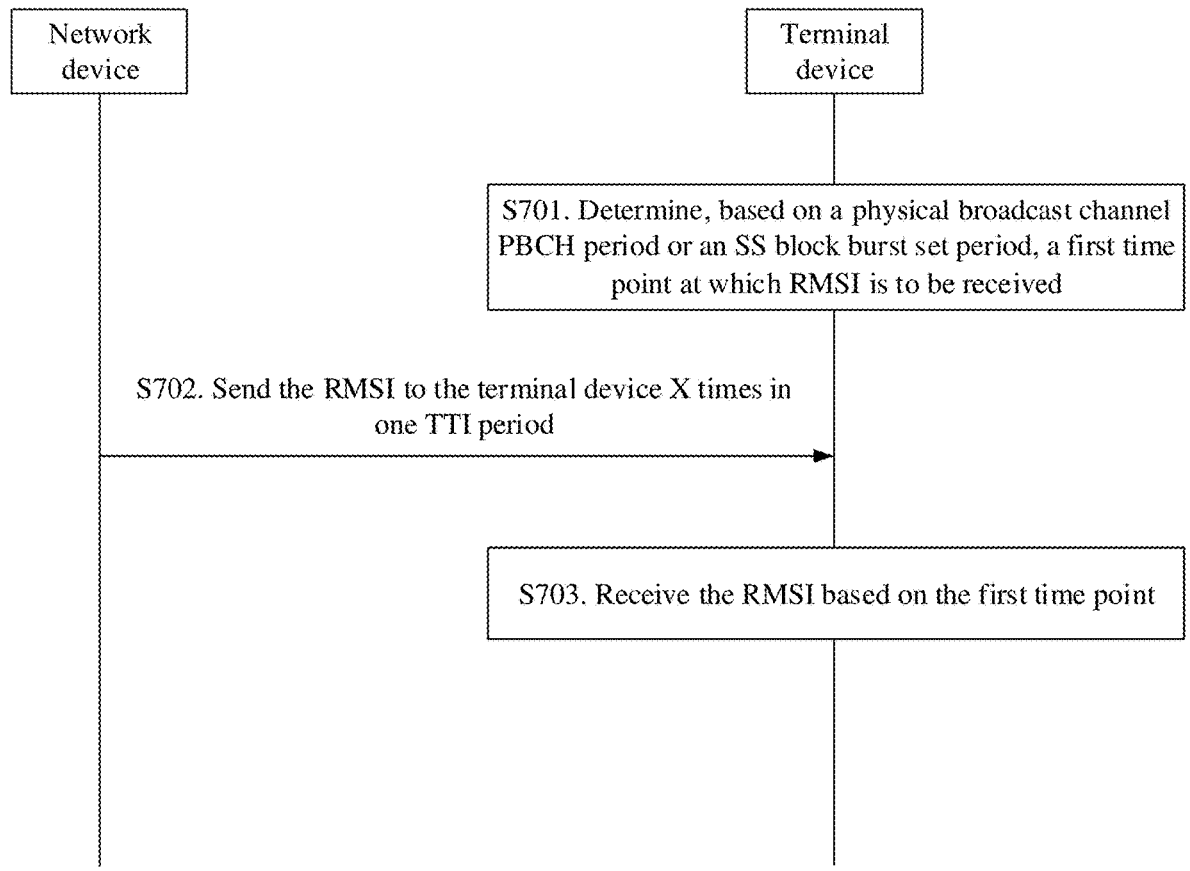
FIG. 7 is a schematic flowchart of still another information sending and receiving method according to an embodiment.

FIG. 7 is a schematic flowchart of still another information sending and receiving method according to an embodiment. The method may be applied to the communications system in FIG. 3. The following performs description from a perspective of an interaction between a network device and a terminal device with reference to FIG. 7. The method may include the following step S701 to step S703.

Step S701: The terminal device determines, based on a physical broadcast channel PBCH period or an SS block burst set period, a first time point at which RMSI is to be received.

Step S702: The network device sends the RMSI to the terminal device X times in one TTI period.

Step S703: The terminal device receives the RMSI based on the first time point.

Specifically, for descriptions of step S701 and step S703, refer to related descriptions of step S401 and step S403 corresponding to FIG. 4. Details are not described herein again.

The TTI period is a preset value, X is a multiple of the PBCH period or the SS block burst set period, or X and the PBCH period are in a one-to-one correspondence or a one-to-many relationship, and in a process in which the RMSI is sent once, the network device sends at least one piece of RMSI by using at least one beam or antenna port.

A difference between step S702 and step S402 corresponding to FIG. 4 lies in that, in step S402 corresponding to FIG. 4, there is no concept of a TTI, in other words, there is no repeated transmission of the RMSI. However, in this embodiment, that the network device sends the RMSI to the terminal device X times means that the RMSI is repeatedly transmitted X times in one TTI. Repeated transmission performed X times may be periodic repeated transmission, or may be non-periodic repeated transmission. Therefore, the terminal device needs to know the TTI period of the RMSI and a specific transmission interval for repeatedly transmitting the RMSI in the TTI period, so as to receive the RMSI at a correct first time.

FIG. 6 is a schematic diagram of repeatedly transmitting RMSI in a TTI according to an embodiment. In FIG. 6, it is assumed that a TTI period is 80 ms, and RMSI is repeatedly transmitted four times in one TTI period, a transmission time interval may be a periodic transmission interval of 20 ms, or may be non-periodic transmission intervals of 10 ms, 20 ms, and 30 ms. The following performs description by using two types of association modes.

In a first type of association mode, in this embodiment, it is proposed that the TTI period is a preset value, and a value of X is associated with the PBCH period or the SS block burst set period, where X is a quantity of times of repeated transmission in one TTI. To be specific, the network device and the terminal device agree on that the TTI is a fixed period, and then agree on an association relationship between X and the PBCH period or the SS block burst set period, where X is the quantity of times of repeatedly transmitting the RMSI in one TTI. In this case, the terminal device may determine the first time at which the RMSI is to be received each time, provided that the terminal device learns of the PBCH period or the SS block burst set period. The following describes how to specify an association relationship between X and the PBCH period in this application.

In a possible implementation, the TTI period is a multiple of the PBCH period or the SS block burst set period, and there may specifically be an integer multiple relationship or a fractional multiple relationship between the TTI period and the PBCH period or the SS block burst set period. The following performs description by using Manner 11 as an example.

Manner 11: In Manner 11, the TTI period is a preset value, to be specific, a preset fixed value, and the association relationship between X and the PBCH period or the SS block burst set period is a multiple relationship, where X is the quantity of times of repeatedly transmitting the RMSI in the TTI period. A specific implementation may be as follows:

1. The TTI period of the RMSI is fixed, and it is specified that X is N times the PBCH period or the SS block burst set period. For example, the TTI is fixed at 160 ms, and a value of N is fixed at 2/5. When the PBCH period is 5 ms, N=2/5, X=2; or when the PBCH period is 20 ms, N=2/5, X=8. It may be understood that the value of N may also change with the PBCH period. This is not described herein by using an example.

2. The network device indicates the PBCH period or the SS block burst set period by using MIB information on a PBCH. For example, the PBCH period may be 5 ms, 10 ms, 20 ms, 40 ms, 80 ms, or 160 ms.

3. After receiving the MIB information added by the network device to the PBCH, the terminal device learns of the PBCH period or the SS block burst set period or information about an RMSI period, and may simultaneously determine, based on information that is about the relationship between the PBCH period and X and that is pre-stored based on a protocol or received from the network device, the period in which the RMSI is to be received and the PBCH period. Details are shown in the following Table 12.

TABLE 12

| PBCH period (or SS block burst set period) | TTI period | A quantity X of times of repeated transmission | Transmission period | Association relationship |
| --- | --- | --- | --- | --- |
| 5 ms | 160 ms | 2 | 160 ms | X is 2/5 times the PBCH period |
| 10 ms | | 4 | 80 ms | X is 2/5 times the PBCH period |
| 20 ms | | 8 | 40 ms | X is 2/5 times the PBCH period |
| 40 ms | | 16 | 20 ms | X is 2/5 times the PBCH period |
| 80 ms | | 32 | 10 ms | X is 2/5 times the PBCH period |
| 160 ms | | 64 | 5 ms | X is 2/5 times the PBCH period |
| ... | ... | ... | ... | ... |

In a possible implementation, X and the PBCH period or the SS block burst set period are in a one-to-one correspondence. The following performs description by using Manner 12 as an example.

Manner 12: In Manner 12, the TTI period is a preset value, to be specific, a preset fixed value, and the association relationship between X and the PBCH period or the SS block burst set period is a one-to-one correspondence, where X is the quantity of times of repeatedly transmitting the RMSI in the TTI period. A specific implementation may be as follows:

1. The TTI period is fixed, and it is specified that the RMSI is repeatedly transmitted in one TTI by using X redundancy versions (RV), and/or the RMSI is repeatedly transmitted in one TTI in Y data scrambling manners, where X is an integer greater than or equal to 1, and the transmission time interval is equal to X*Y.

A direct mapping relationship between X and the PBCH period or the SS block burst set period may be a one-to-one mapping relationship. For example, in the one-to-one relationship, the TTI is fixed at 160 ms. When the PBCH period is 5 ms, X=64, and a period in which the repeated RMSI is to be transmitted is 5 ms; or when the PBCH period is 20 ms, X=16, and an RMSI period is 20 ms.

2. The network device indicates the PBCH period, the SS block burst set period, or information about the RMSI period by using MIB information on a PBCH. For example, the PBCH period may be 5 ms, 10 ms, 20 ms, 40 ms, 80 ms, or 160 ms.

3. After receiving the MIB information added by the network device to the PBCH, the terminal device learns of the PBCH period or the SS block burst set period or the RMSI period, and may determine, based on information that is about a relationship between the PBCH period and the RMSI period and that is pre-stored based on a protocol or received from the network device, the period in which the RMSI is to be received, to be specific, the first time point, or the PBCH period. Details are shown in the following Table 13.

TABLE 13

| PBCH period (or SS block burst set period) | TTI period | A quantity X of times of repeated transmission | Transmission period | Association relationship |
|---|---|---|---|---|
| 5 ms | 160 ms | 64 | 5 ms | One-to-one correspondence |
| 10 ms | | 32 | 10 ms | One-to-one correspondence |
| 20 ms | | 16 | 20 ms | One-to-one correspondence |
| 40 ms | | 8 | 40 ms | One-to-one correspondence |
| 80 ms | | 5 | 64 ms | One-to-one correspondence |
| 160 ms | | 4 | 80 ms | One-to-one correspondence |
| . . . | . . . | . . . | . . . | . . . |

In a possible implementation, X and the PBCH period are in a one-to-many relationship, where X is the quantity of times of repeatedly transmitting the RMSI in one TTI. The following performs description by using Manner 13 as an example.

Manner 13: In Manner 13, the TTI period is a preset value, to be specific, a preset fixed value, and the association relationship between X and the PBCH period or the SS block burst set period is a one-to-many correspondence, where X is the quantity of times of repeatedly transmitting the RMSI in the TTI period. A specific implementation may be as follows:

1. The TTI period is fixed, and it is specified that a direct mapping relationship between X and the PBCH period or the SS block burst set period may be a one-to-many mapping relationship, where X is the quantity of times of repeatedly transmitting the RMSI in one TTI. For example, in the one-to-many relationship, the TTI period is fixed at 160 ms. When the PBCH period is 5 ms and 10 ms, the quantity X of times of repeated transmission is equal to 4, and a period of repeated transmission is 80 ms; or when the PBCH period is 20 ms and 40 ms, the quantity X of times of repeated transmission is equal to 8, and a period of repeated transmission is 40 ms.

2. The network device indicates the PBCH period, the SS block burst set period, or information about the RMSI period by using MIB information on a PBCH. For example, the PBCH period may be 5 ms, 10 ms, 20 ms, 40 ms, 80 ms, or 160 ms.

3. After receiving the MIB information added by the network device to the PBCH, the terminal device learns of the PBCH period or the SS block burst set period, and may determine, based on information that is about a relationship between the PBCH period and the quantity of times of repeated transmission and that is pre-stored based on a protocol or received from the network device, all or some of the information about the period in which the RMSI is to be received, or all or some of information about the PBCH period. Details are shown in the following Table 14.

TABLE 14

| PBCH period (or SS block burst set period) | TTI period | A quantity X of times of repeated transmission | Transmission period | Association relationship |
|---|---|---|---|---|
| 5 ms | 160 ms | 4 | 80 ms | One-to-many correspondence |
| 10 ms | | | | |
| 20 ms | | 8 | 40 ms | One-to-many correspondence |
| 40 ms | | | | |
| 80 ms | | 16 | 20 ms | One-to-many correspondence |
| 160 ms | | | | |
| . . . | . . . | . . . | . . . | . . . |

In a second type of association mode, in this embodiment, it is proposed that a quantity X of times of repeatedly transmitting the RMSI in one TTI is a preset value. Optionally, the network device indicates a value of X by using signaling. The signaling may specifically be RRC signaling, DCI signaling, or a MAC CE. The TTI period is associated with the PBCH period. To be specific, the network device and the terminal device agree on that the quantity X of times of repeatedly transmitting the RMSI in one TTI is fixed. Then, the network device and the terminal device agree on an association relationship between one TTI period and the PBCH period. In this case, the terminal device may determine a period in which the RMSI is to be received each time, to be specific, the first time, provided that the terminal device learns of the PBCH period. The following describes how to specify an association relationship between the TTI period and the PBCH period in this application.

In a possible implementation, the TTI period is a multiple of the PBCH period, and there may specifically be an integer multiple relationship or a fractional multiple relationship between the TTI period and the PBCH period. The following performs description by using Manner 14 as an example.

Manner 14: In Manner 14, the quantity X of times of repeatedly transmitting the RMSI in one TTI is a preset value, to be specific, a preset fixed value, and the association relationship between the TTI period and the PBCH period or the SS block burst set period is a multiple relationship. A specific implementation may be as follows:

1. The quantity of times of repeatedly transmitting the RMSI in the TTI period is fixed. For example, the quantity of times of repeated transmission is always X regardless of the PBCH period. For example, the quantity X of times of repeated transmission in one TTI period is equal to 4.

2. The TTI period is associated with the PBCH period. For example, the TTI period is N times the PBCH period or the SS block burst set period, and N=4. When the PBCH period is 20 ms, the TTI period is 80 ms, and the quantity X of times of repeated transmission is fixed at 4, and in this case, the period of repeated transmission is 20 ms. When the PBCH period is 40 ms, the TTI period is 160 ms, the quantity X of times of repeated transmission is fixed at 4, and the period of repeated transmission is 40 ms.

3. The network device indicates the PBCH period, the SS block burst set period, or information about the RMSI period by using MIB information on a PBCH. For example, the PBCH period may be 5 ms, 10 ms, 20 ms, 40 ms, 80 ms, or 160 ms.

4. After receiving the MIB information added by the network device to the PBCH, the terminal device learns of the PBCH period or the SS block burst set period, and may simultaneously determine, based on information that is about a relationship between the PBCH period and the RMSI period and that is pre-stored based on a protocol or received from the network device, all or some of the information about the period in which the RMSI is to be received and some or all of information about the PBCH period. Details are shown in the following Table 15.

TABLE 15

| PBCH period (or SS block burst set period) | TTI period | A quantity X of times of repeated transmission | Transmission period | Association relationship |
| --- | --- | --- | --- | --- |
| 5 ms | 20 ms | 4 | 5 ms | The TTI period is four times the PBCH period |
| 10 ms | 40 ms | | 10 ms | The TTI period is four times the PBCH period |
| 20 ms | 80 ms | | 20 ms | The TTI period is four times the PBCH period |
| 40 ms | 160 ms | | 40 ms | The TTI period is four times the PBCH period |
| 80 ms | 320 ms | | 80 ms | The TTI period is four times the PBCH period |
| 160 ms | 640 ms | | 160 ms | The TTI period is four times the PBCH period |
| . . . | . . . | | . . . | . . . |

In a possible implementation, the TTI period and the PBCH period are in a one-to-one correspondence. The following performs description by using Manner 15 as an example.

Manner 15: In Manner 15, the quantity X of times of repeatedly transmitting the RMSI in one TTI is a preset value, to be specific, a preset fixed value, and the association relationship between the TTI period and the PBCH period or the SS block burst set period is a one-to-one correspondence. A specific implementation may be as follows:

1. A value of X is fixed, and a direct mapping relationship between the TTI period and the PBCH period or the SS block burst set period may be a one-to-one mapping relationship. For example, the quantity X of times of repeated transmission is fixed at four, and in the one-to-one relationship, when the PBCH period is 5 ms, TTI=20 ms, and the period of repeated transmission is 5 ms; or when the PBCH period is 20 ms, TTI=80 ms, and the period of repeated transmission is 20 ms.

2. The network device indicates the PBCH period, the SS block burst set period, or information about the RMSI period by using MIB information on a PBCH. For example, the PBCH period may be 5 ms, 10 ms, 20 ms, 40 ms, 80 ms, or 160 ms.

3. After receiving the MIB information added by the network device to the PBCH, the terminal device learns of the PBCH period, and may simultaneously determine, based on information that is about a relationship between the PBCH period or the SS block burst set period and the RMSI period and that is pre-stored based on a protocol or received from the network device, all or some of the information about the period in which the RMSI is to be received and some or all of information about the PBCH period. Details are shown in the following Table 16.

TABLE 16

| PBCH period (or SS block burst set period) | TTI period | A quantity X of times of repeated transmission | Transmission period | Association relationship |
| --- | --- | --- | --- | --- |
| 5 ms | 20 ms | 4 | 5 ms | One-to-one correspondence |
| 10 ms | 40 ms | | 10 ms | One-to-one correspondence |
| 20 ms | 80 ms | | 20 ms | One-to-one correspondence |
| 40 ms | 120 ms | | 30 ms | One-to-one correspondence |
| 80 ms | 160 ms | | 40 ms | One-to-one correspondence |
| 160 ms | 240 ms | | 60 ms | One-to-one correspondence |
| . . . | | | | . . . |

In a possible implementation, the TTI period and the PBCH period are in a one-to-many relationship. The following performs description by using Manner 16 as an example.

Manner 16: In Manner 16, X is a preset value, to be specific, a preset fixed value, and the association relationship between the TTI period and the PBCH period or the SS block burst set period is a one-to-many correspondence, where X is the quantity of times of repeatedly transmitting the RMSI in the TTI period. A specific implementation may be as follows:

1. A value of X is fixed, and a correspondence between the TTI period and the PBCH period or the SS block burst set period may be a one-to-many correspondence. For example, X is fixed at four, and in the one-to-many relationship, when the PBCH period is 5 ms and 10 ms, TTI=20 ms, and the period of repeated transmission is 5 ms; or when the PBCH period is 20 ms and 40 ms, TTI=40 ms, and the period of repeated transmission is 10 ms.

2. The network device indicates the PBCH period or the SS block burst set period or information about the RMSI period by using MIB information on a PBCH. For example, the PBCH period or the SS block burst set period may be 5 ms, 10 ms, 20 ms, 40 ms, 80 ms, or 160 ms.

3. After receiving the MIB information added by the network device to the PBCH, the terminal device learns of the PBCH period or the SS block burst set period, and may simultaneously determine, based on information that is about a relationship between the PBCH period and the RMSI period and that is pre-stored based on a protocol or received from the network device, all or some of the information about the period in which the RMSI is to be received and some or all information about the PBCH period. Details are shown in the following Table 17.

TABLE 17

| PBCH period (or SS block burst set period) | TTI period | A quantity X of times of repeated transmission | Transmission period | Association relationship |
|---|---|---|---|---|
| 5 ms 10 ms | 20 ms | 4 | 5 ms | One-to-many correspondence |
| 20 ms 40 ms | 40 ms | | 10 ms | One-to-many correspondence |
| 80 ms 160 ms | 80 ms | | 20 ms | One-to-many correspondence |
| ... | | | | ... |

This application further provides Manner 17: When a plurality of times of repeated transmission in one TTI are non-periodic, assuming that the transmission interval is agreed on in advance, and there is an association relationship between the quantity X of times of repeated retransmission and the PBCH period or the SS block burst set period, in this case, the terminal device may learn of the quantity of times of repeated transmission by using the PBCH period. Further, because the transmission interval in one TTI is fixed, the terminal device may finally determine a complete TTI period based on the PBCH period. Details are shown in the following Table 18.

TABLE 18

| PBCH period (or SS block burst set period) | TTI period | A quantity X of times of repeated transmission | Transmission period | Association relationship |
|---|---|---|---|---|
| 5 ms | 30 ms | 2 | 10 ms | One-to-many correspondence |
| 10 ms | 30 ms | 2 | 10 ms | One-to-many correspondence |
| 20 ms | 80 ms | 3 | 10 ms and 20 ms | One-to-many correspondence |
| 40 ms | 80 ms | 3 | 10 ms and 20 ms | One-to-many correspondence |
| 80 ms | 160 ms | 4 | 10 ms, 20 ms, and 50 ms | One-to-many correspondence |
| 160 ms | 160 ms | 4 | 10 ms, 20 ms, and 40 ms | One-to-many correspondence |
| ... | ... | ... | ... | ... |

This application further provides Manner 18.

When a plurality of times of repeated transmissions in one TTI are non-periodic, assuming that the transmission interval is agreed on in advance, and it is specified that there is an association relationship between the TTI period and the PBCH period, in this case, the terminal device may learn of the quantity of times of repeated transmission by using the PBCH period or the SS block burst set period. Further, because the transmission interval in one TTI is fixed, the terminal device may finally determine a complete TTI period based on the PBCH period. Details are shown in the following Table 19.

TABLE 19

| PBCH period (or SS block burst set period) | TTI period | A quantity X of times of repeated transmission | Transmission interval |
|---|---|---|---|
| 5 ms | 80 ms | 4 | 10 ms, 20 ms, 50 ms, and 80 ms |
| 10 ms | 80 ms | 4 | 10 ms, 20 ms, 50 ms, and 80 ms |
| 20 ms | 80 ms | 4 | 10 ms, 20 ms, 50 ms, and 80 ms |
| 40 ms | 160 ms | 5 | 10 ms, 20 ms, 50 ms, and 80 ms |

TABLE 19-continued

| PBCH period (or SS block burst set period) | TTI period | A quantity X of times of repeated transmission | Transmission interval |
|---|---|---|---|
| 80 ms | 160 ms | 5 | 10 ms, 20 ms, 50 ms, and 80 ms |
| 160 ms | 160 ms | 5 | 10 ms, 20 ms, 40 ms, and 80 ms |
| ... | ... | ... | ... |

It may be understood that, for the association relationship between the TTI period and the PBCH period in the foregoing Manner 17 and Manner 18, refer to the association relationships in the foregoing Manner 11 to Manner 16. Details are not described herein again.

This application further provides Manner 19: When a plurality of times of repeated transmissions in one TTI are non-periodic, assuming that the transmission interval is agreed on in advance, and it is specified that the TTI period and the quantity of times of repeated transmission are also fixed, in this case, the terminal device may directly learn of the first time. Details are shown in the following Table 20.

TABLE 20

| PBCH period (or SS block burst set period) | TTI period | A quantity X of times of repeated transmission | Transmission interval |
|---|---|---|---|
| 5 ms | 80 ms | 4 | 10 ms, 20 ms, and 40 ms |
| 10 ms | | | 10 ms, 20 ms, and 40 ms |
| 20 ms | | | 10 ms, 20 ms, and 40 ms |
| 40 ms | | | 10 ms, 20 ms, and 40 ms |
| 80 ms | | | 10 ms, 20 ms, and 40 ms |
| 160 ms | | | 10 ms, 20 ms, and 40 ms |
| ... | | | ... |

This application further provides Manner 20: When the scheduling period of the RMSI is 80 ms or 160 ms, the quantity of repetitions based on different RVs or other scheduling manners are agreed on in advance, for example, 4 or 1, or configured by using an MIB. Alternatively, the period of the RMSI of different RVs is 20 ms or 40 ms.

This application further provides Manner 21: A minimum value of the RMSI period and/or a minimum value of the transmission time interval TTI period are constrained by using a protocol or configured by the network device. For example, the minimum value of the RMSI period is 160 ms. If the network device configures the RMSI period as N times the SS block burst set period/PBCH period by using an MIB, an actual RMSI period is a larger value of 160 ms and N times the PBCH period. The minimum value of the transmission time interval TTI period is 160 ms. If the network device configures the transmission time interval TTI period as N times the SS block burst set period/PBCH period by using an MIB, an actual transmission time interval TTI period is a larger value of 160 ms and N times the PBCH period.

Figure 8:
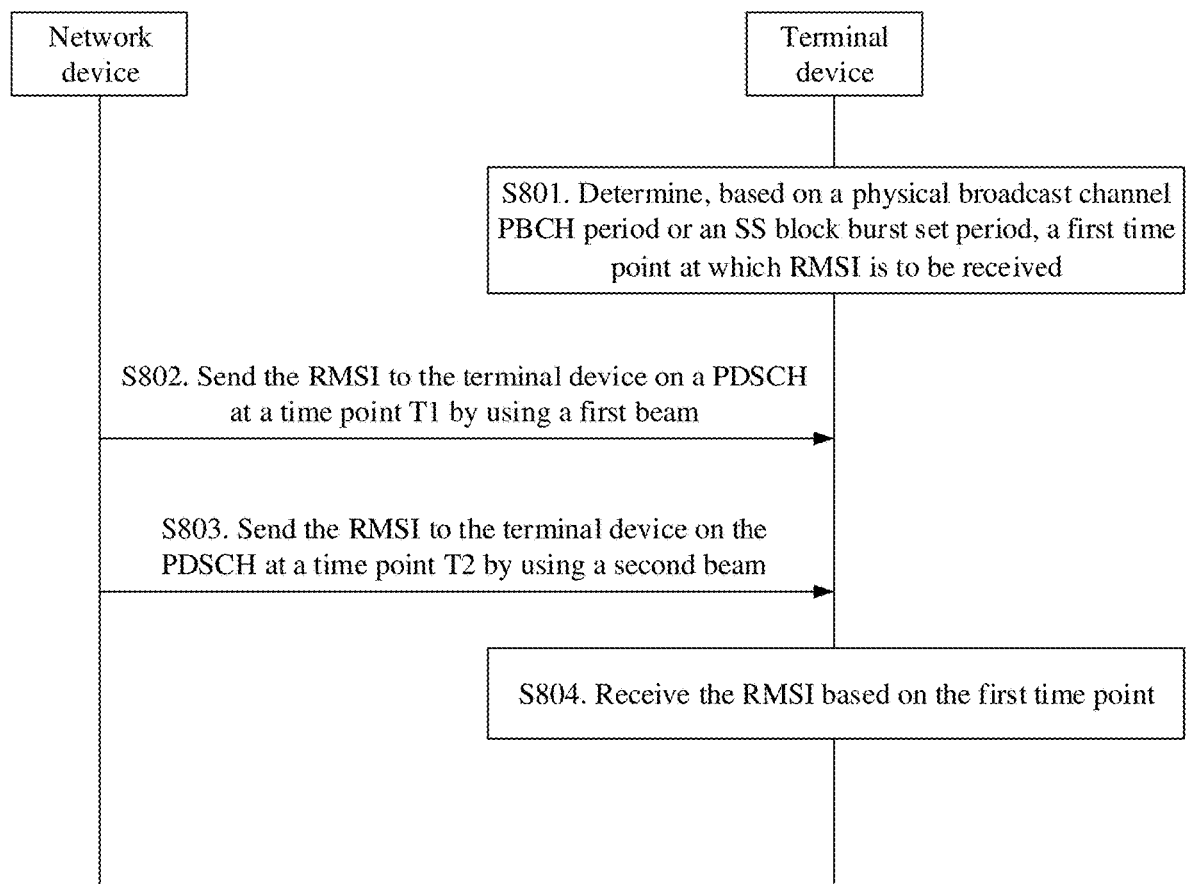
FIG. 8 is a schematic flowchart of still another information sending and receiving method according to an embodiment.

FIG. 8 is a schematic flowchart of still another information sending and receiving method according to an embodiment. The method may be applied to the communications system in FIG. 3. The following performs description from a perspective of an interaction between a network device and a terminal device with reference to FIG. 8. The method may include the following step S801 to step S803.

Step S801: The terminal device determines, based on a physical broadcast channel PBCH period or an SS block burst set period, a first time point at which RMSI is to be received.

Step S802: The network device sends the RMSI to the terminal device on a PDSCH at a time point T1 by using a first beam.

Step S803: The network device sends the RMSI to the terminal device on the PDSCH at a time point T2 by using a second beam, where the RMSI includes at least one of the following information: configuration information of a random access channel, configuration information of a paging channel, configuration information of a downlink shared channel, configuration information of an uplink shared channel, a public land mobile network identifier list, a tracking area code, cell barring access information, scheduling information of an open systems interconnection OSI or a system information block SIB, a system information value tag, bandwidth indication information, and cell reselection information.

Step S804: The terminal device receives the RMSI based on the first time point.

In this embodiment, in a period in which the RMSI is transmitted (including a time interval X in which there is no repeated transmission and a period X in which there is repeated transmission), different beams are also periodic in each time interval X, or may not be periodic and have a time offset relative to a period location. The period or the time offset may be configured by using an MIB. The different beams may be periodic, or a combination of a plurality of beams may be periodic. The different beams may be different antenna ports, or time-frequency resources of corresponding SS blocks, or time-frequency resources that are QCL with SS blocks, or may be time-frequency resources used by the base station to transmit same content to different areas of a coverage cell, or different antenna ports are periodic.

Figure 9A:
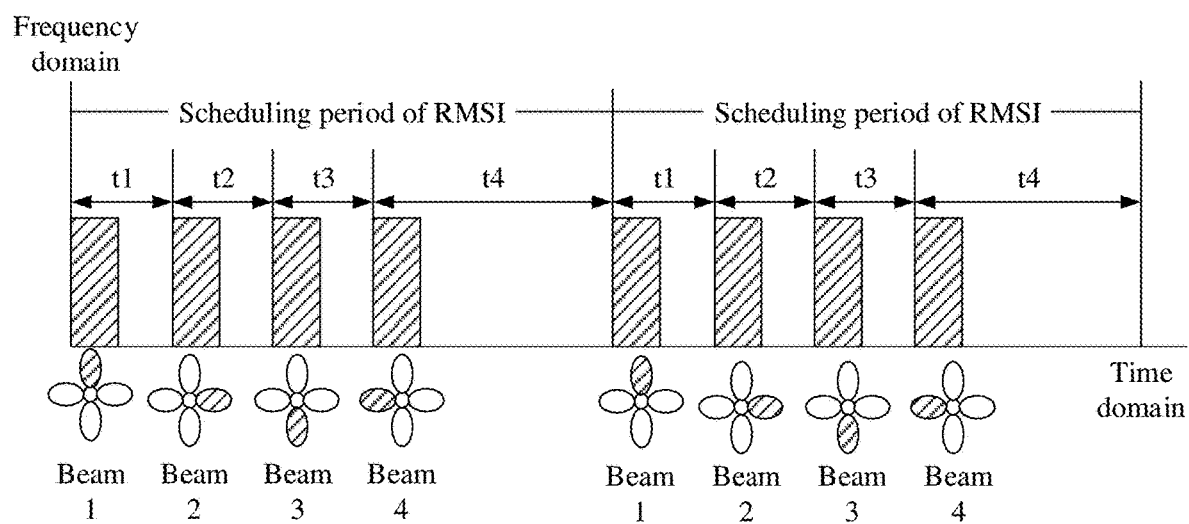
FIG. 9A is a schematic diagram of a period of transmission performed by using different beam according to an embodiment.
Figure 9B:
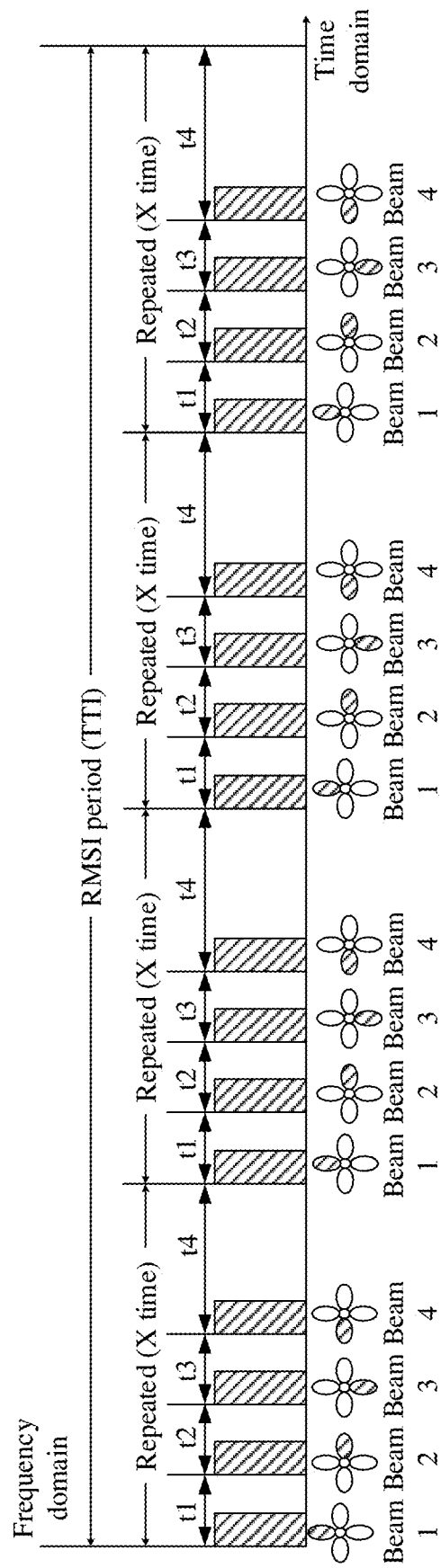
FIG. 9B is a schematic diagram of a period of transmitting RMSI by using different beams within one TTI according to an embodiment.
Figure 9C:
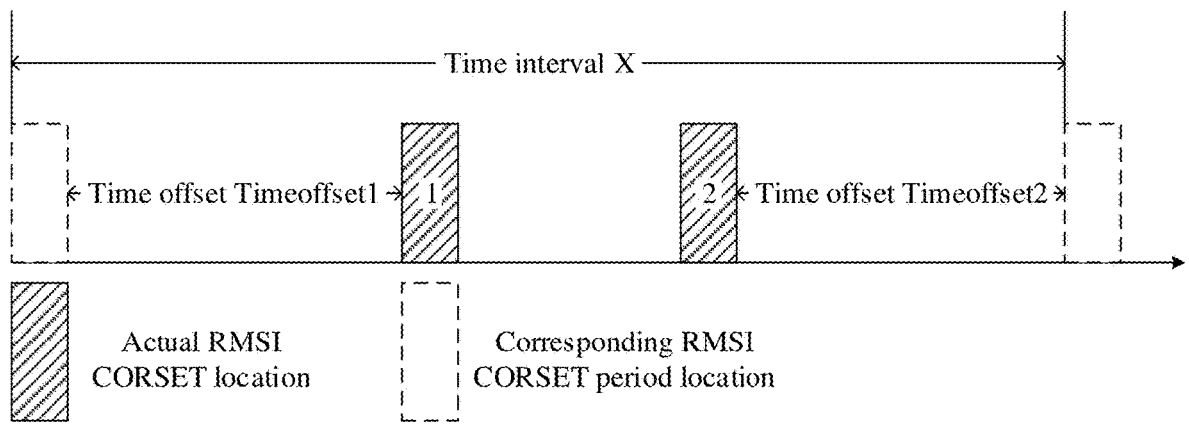
FIG. 9C is a schematic diagram of transmission performed by using different beams that have a time offset relative to a period location according to an embodiment.

As shown in FIG. 9A, FIG. 9A is a schematic diagram of a period in which RMSI is transmitted by using different beams according to an embodiment. For example, a beam 1, a beam 2, a beam 3, and a beam 4 respectively correspond to transmission periods t1, t2, t3, and t4. FIG. 9B is a schematic diagram of a period in which RMSI is transmitted by using different beams in one TTI. FIG. 9C is a schematic diagram of transmission performed by using different beams that have a time offset relative to a period location. An example is used for description. A period in which repeated RMSI is transmitted by using a different beam is 10 ms, and a period location of the period of repeated transmission is a subframe 5 of each frame, to be specific, the RMSI is transmitted in a subframe 5 of a frame 0, the RMSI is transmitted in a subframe 5 of a frame 1, and the RMSI is transmitted in a subframe 5 of a frame 2. Assuming that a time offset of a first beam is −1 subframe, a time offset of a second beam is 1 subframe, and a time offset of a third beam is 0, a location at which the RMSI is transmitted in the frame 0 is a subframe 4, a transmission location of the RMSI in the frame 1 is a subframe 6, a transmission location of the RMSI in the frame 2 is the subframe 5.

In the embodiments of this application, function modules of a transmit end device or a receive end device may be divided based on the foregoing method examples. For example, function modules may be divided based on functions, or two or more functions may be integrated into one processing module. The integrated module may be implemented in a form of hardware, or may be implemented in a form of a software function module. It should be noted that the module division in the embodiments of this application is an example, and is merely logical function division. There may be another division manner in an actual implementation. The following performs description by using an example in which function modules are divided based on functions.

Figure 10:
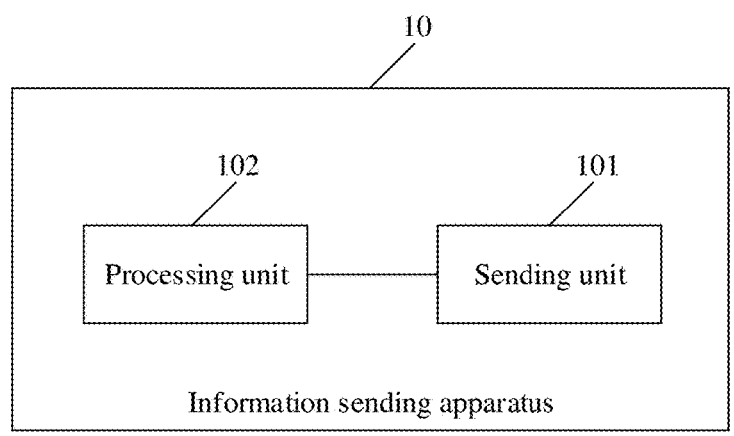
FIG. 10 is a schematic structural diagram of an information sending apparatus according to an embodiment.

FIG. 10 is a schematic structural diagram of an information sending apparatus 10 according to an embodiment. The information sending apparatus 10 may be a network device or a chip. The information sending apparatus 10 may include a processing unit 102 and a sending unit 101. Detailed descriptions of the units are as follows:

The processing unit 102 is configured to determine, based on a PBCH period or an SS block burst set period, a period in which RMSI is to be sent.

The sending unit 101 is configured to send the remaining minimum system information RMSI to a terminal device by using X as the period, where X is a multiple of the PBCH period, or X and the PBCH period are in a one-to-one correspondence or a one-to-many relationship, and in a process in which the RMSI is sent once, the network device sends at least one piece of RMSI by using at least one beam or antenna port.

In a possible implementation, the sending unit 101 is further configured to send indication information to the terminal device, where the indication information is used to indicate the PBCH period.

It should be noted that, for functions of the functional units in the information sending apparatus 10 described in this embodiment, reference may be made to related descriptions in the foregoing method embodiments shown in FIG. 1 to FIG. 9. Details are not described herein again.

Figure 11:
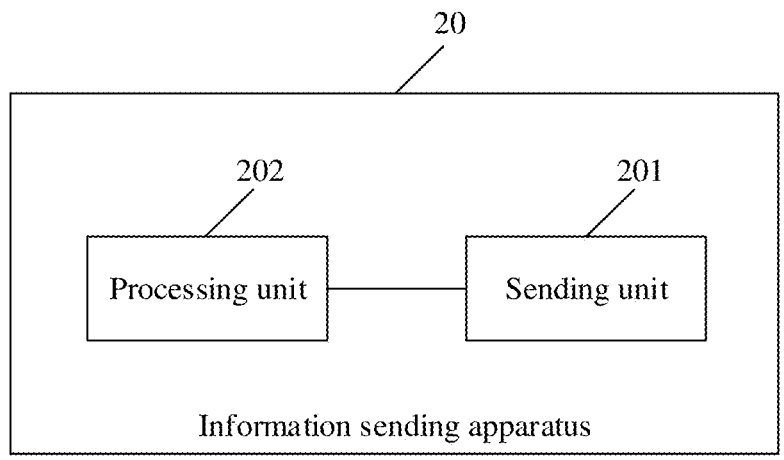
FIG. 11 is a schematic structural diagram of another information sending apparatus according to an embodiment.

FIG. 11 is a schematic structural diagram of another information sending apparatus 20 according to an embodiment. The information sending apparatus 20 may be a network device or a chip. The information sending apparatus 20 may include a processing unit 202 and a sending unit 201. Detailed descriptions of the units are as follows:

The processing unit 202 is configured to determine, based on a PBCH period or an SS block burst set period, a period in which RMSI is to be sent.

The sending unit 201 is configured to send the remaining minimum system information RMSI to a terminal device by using X as the period in one transmission time interval TTI period, or the network device sends the RMSI to a terminal device X times in one TTI period, where the TTI period is a preset value, X is a multiple of the PBCH period, or X and the PBCH period are in a one-to-one correspondence or a one-to-many relationship, and in a process in which the RMSI is sent once, the network device sends at least one piece of RMSI by using at least one beam or antenna port.

In a possible implementation, the sending unit 201 is further configured to send indication information to the terminal device, where the indication information is used to indicate the PBCH period.

It should be noted that, for functions of the functional units in the information sending apparatus 20 described in this embodiment, reference may be made to related descriptions in the foregoing method embodiments shown in FIG. 1 to FIG. 9. Details are not described herein again.

Figure 12:
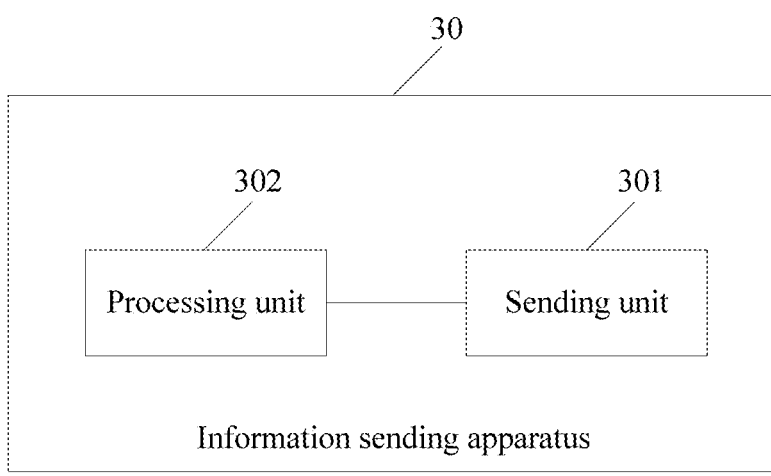
FIG. 12 is a schematic structural diagram of still another information sending apparatus according to an embodiment.

FIG. 12 is a schematic structural diagram of an information sending apparatus 30 according to an embodiment. The information sending apparatus 30 may be a network device or a chip. The information sending apparatus 30 may include a processing unit 302 and a sending unit 301. Detailed descriptions of the units are as follows:

The processing unit 302 is configured to determine, based on a PBCH period or an SS block burst set period, a period in which RMSI is to be sent.

The sending unit 301 is configured to send the remaining minimum system information RMSI to a terminal device by using X as the period in one transmission time interval TTI period, or the network device sends the RMSI to a terminal device X times in one TTI period, where X is a preset value, the TTI period is a multiple of the PBCH period, or the TTI period and the PBCH period are in a one-to-one correspondence or a one-to-many relationship, and in a process in which the RMSI is sent once, the network device sends at least one piece of RMSI by using at least one beam or antenna port.

In a possible implementation, the sending unit 301 is further configured to send indication information to the terminal device, where the indication information is used to indicate the PBCH period.

In a possible implementation, the sending unit 301 is further configured to indicate a value of X by using signaling.

It should be noted that, for functions of the functional units in the information sending apparatus 30 described in this embodiment, reference may be made to related descriptions in the foregoing method embodiments shown in FIG. 1 to FIG. 9. Details are not described herein again.

Figure 13:
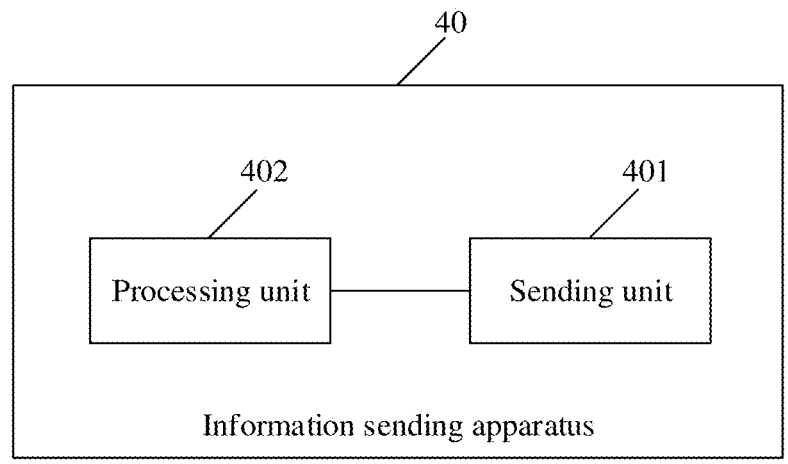
FIG. 13 is a schematic structural diagram of still another information sending apparatus according to an embodiment.

FIG. 13 is a schematic structural diagram of an information sending apparatus 40 according to an embodiment. The information sending apparatus 40 may be a network device or a chip. The information sending apparatus 40 may include a processing unit 402 and a sending unit 401. Detailed descriptions of the units are as follows:

The processing unit 402 is configured to determine, based on a PBCH period or an SS block burst set period, a period in which RMSI is to be sent.

The sending unit 401 is configured to send the RMSI to a terminal device on a PDSCH at a time point T1 by using a first beam.

The sending unit 401 is further configured to send the RMSI to the terminal device on the PDSCH at a time point T2 by using a second beam, where the RMSI includes at least one of the following information: configuration information of a random access channel, configuration information of a paging channel, configuration information of a downlink shared channel, configuration information of an uplink shared channel, a public land mobile network identifier list, a tracking area code, cell barring access information, scheduling information of an open systems interconnection OSI or a system information block SIB, a system information value tag, bandwidth indication information, and cell reselection information; and a time interval between T2 and T1 is associated with the physical broadcast channel PBCH period.

In a possible implementation, the sending unit 401 is further configured to send indication information to the terminal device, where the indication information is used to indicate the PBCH period.

It should be noted that, for functions of the functional units in the information sending apparatus 40 described in this embodiment, reference may be made to related descriptions in the foregoing method embodiments shown in FIG. 1 to FIG. 9. Details are not described herein again.

Figure 14:
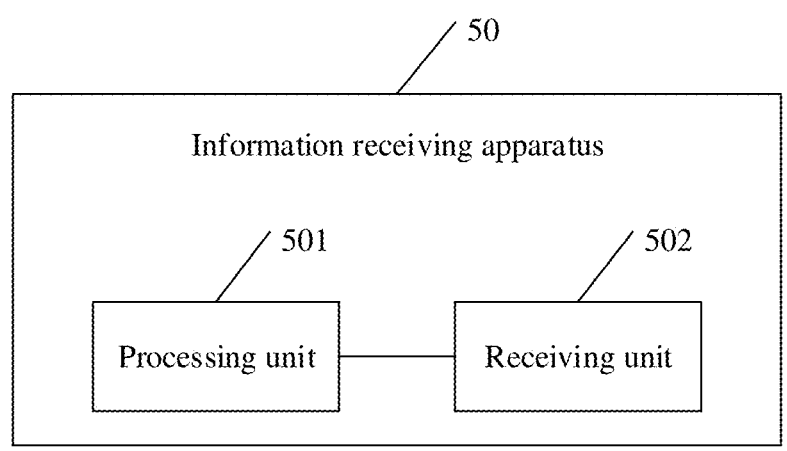
FIG. 14 is a schematic structural diagram of an information receiving apparatus according to an embodiment.

FIG. 14 is a schematic structural diagram of an information receiving apparatus 50 according to an embodiment. The information receiving apparatus 50 may be a terminal device or a chip. The information receiving apparatus 50 may include a processing unit 501 and a receiving unit 502. Detailed descriptions of the units are as follows:

The processing unit 501 is configured to determine, based on a physical broadcast channel PBCH period, a first time point at which RMSI is to be received, where the RMSI is RMSI received by the terminal device from a network device by using X as a period, X is a multiple of the PBCH period, or X and the PBCH period are in a one-to-one correspondence or a one-to-many relationship, and in a process in which the RMSI is received once, the terminal device receives at least one piece of RMSI by using at least one beam or antenna port.

The receiving unit 502 is configured to receive the RMSI based on the first time point.

In a possible implementation, the receiving unit 502 is further configured to receive indication information sent by the network device, where the indication information is used to indicate the PBCH period.

It should be noted that, for functions of the functional units in the information receiving apparatus 50 described in this embodiment, reference may be made to related descriptions in the foregoing method embodiments shown in FIG. 1 to FIG. 9. Details are not described herein again.

Figure 15:
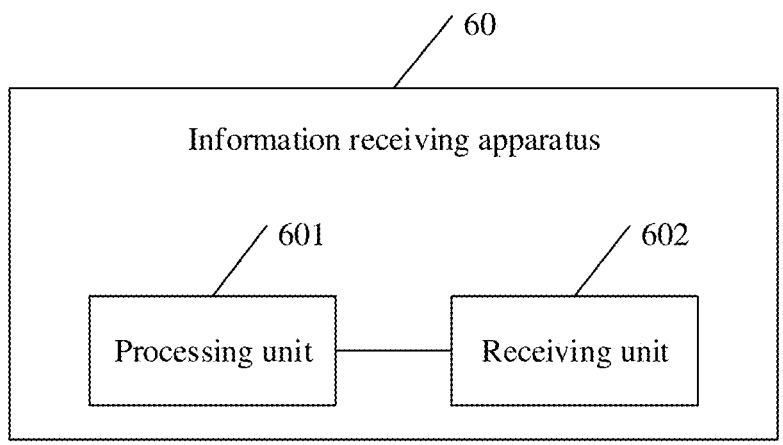
FIG. 15 is a schematic structural diagram of another information receiving apparatus according to an embodiment.

FIG. 15 is a schematic structural diagram of an information receiving apparatus 60 according to an embodiment. The information receiving apparatus 60 may be a terminal device or a chip. The information receiving apparatus 60 may include a processing unit 601 and a receiving unit 602. Detailed descriptions of the units are as follows:

The processing unit 601 is configured to determine, based on a physical broadcast channel PBCH period, a first time point at which RMSI is to be received, where the RMSI is RMSI received by the terminal device from a network device by using X as a period in one transmission time interval TTI period, or RMSI received by the terminal device from a network device X times in one TTI period, the TTI period is a preset value, X is a multiple of the PBCH period, or X and the PBCH period are in a one-to-one correspondence or a one-to-many relationship, and in a process in which the RMSI is received once, the terminal device receives at least one piece of RMSI by using at least one beam or antenna port.

The receiving unit 602 is configured to receive the RMSI based on the first time point.

In a possible implementation, the receiving unit 602 is further configured to receive indication information sent by the network device, where the indication information is used to indicate the PBCH period.

It should be noted that, for functions of the functional units in the information receiving apparatus 60 described in this embodiment, reference may be made to related descriptions in the foregoing method embodiments shown in FIG. 1 to FIG. 9. Details are not described herein again.

Figure 16:
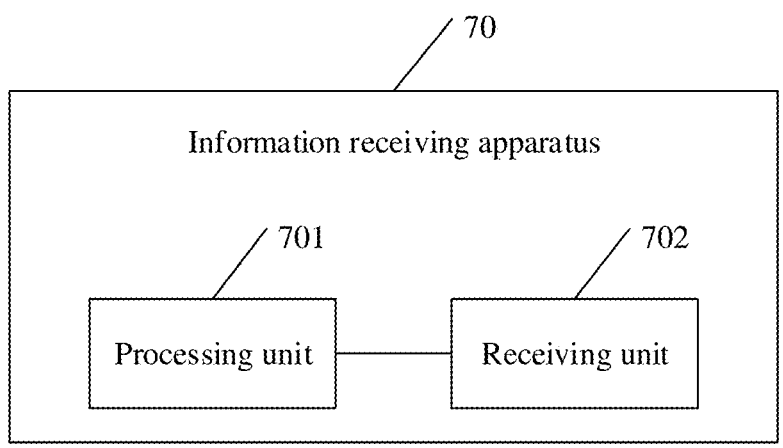
FIG. 16 is a schematic structural diagram of still another information receiving apparatus according to an embodiment.

FIG. 16 is a schematic structural diagram of an information receiving apparatus 70 according to an embodiment. The information receiving apparatus 70 may be a terminal device or a chip. The information receiving apparatus 70 may include a processing unit 701 and a receiving unit 702. Detailed descriptions of the units are as follows:

The processing unit 701 is configured to determine, based on a physical broadcast channel PBCH period, a first time point at which RMSI is to be received, where the RMSI is RMSI received by the terminal device from a network device by using X as a period in one transmission time interval TTI period, or RMSI received by the terminal device from a network device X times in one TTI period, X is a preset value, the TTI period is a multiple of the PBCH period, or the TTI period and the PBCH period are in a one-to-one correspondence or a one-to-many relationship, and in a process in which the RMSI is received once, the terminal device receives at least one piece of RMSI by using at least one beam or antenna port.

The receiving unit 702 is configured to receive the RMSI based on the first time point.

In a possible implementation, the receiving unit 702 is further configured to receive indication information sent by the network device, where the indication information is used to indicate the PBCH period.

It should be noted that, for functions of the functional units in the information receiving apparatus 70 described in this embodiment, reference may be made to related descriptions in the foregoing method embodiments shown in FIG. 1 to FIG. 9. Details are not described herein again.

Figure 17:
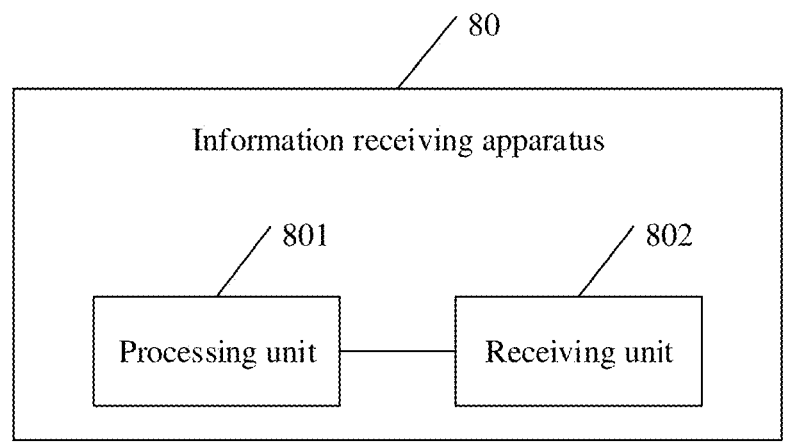
FIG. 17 is a schematic structural diagram of still another information receiving apparatus according to an embodiment.

FIG. 17 is a schematic structural diagram of an information receiving apparatus 80 according to an embodiment. The information receiving apparatus 80 may be a terminal device or a chip. The information receiving apparatus 80 may include a processing unit 801 and a receiving unit 802. Detailed descriptions of the units are as follows:

The processing unit 801 is configured to determine, based on a physical broadcast channel PBCH period, a first time point at which RMSI is to be received, where the RMSI is a system message that is received by the terminal device from a network device on a PDSCH at a time point T1 by using a first beam and received from the network device on the PDSCH at a time point T2 by using a second beam, and the RMSI includes at least one of the following information: configuration information of a random access channel, configuration information of a paging channel, configuration information of a downlink shared channel, configuration information of an uplink shared channel, a public land mobile network identifier list, a tracking area code, cell barring access information, scheduling information of an open systems interconnection OSI or a system information block SIB, a system information value tag, bandwidth indication information, and cell reselection information; and a time interval between T2 and T1 is associated with the PBCH period.

The receiving unit 802 is configured to receive the RMSI based on the first time point.

In a possible implementation, the receiving unit 802 is further configured to receive indication information sent by the network device, where the indication information is used to indicate the PBCH period.

It should be noted that, for functions of the functional units in the information receiving apparatus 80 described in this embodiment, reference may be made to related descriptions in the foregoing method embodiments shown in FIG. 1 to FIG. 9. Details are not described herein again.

Figure 18:
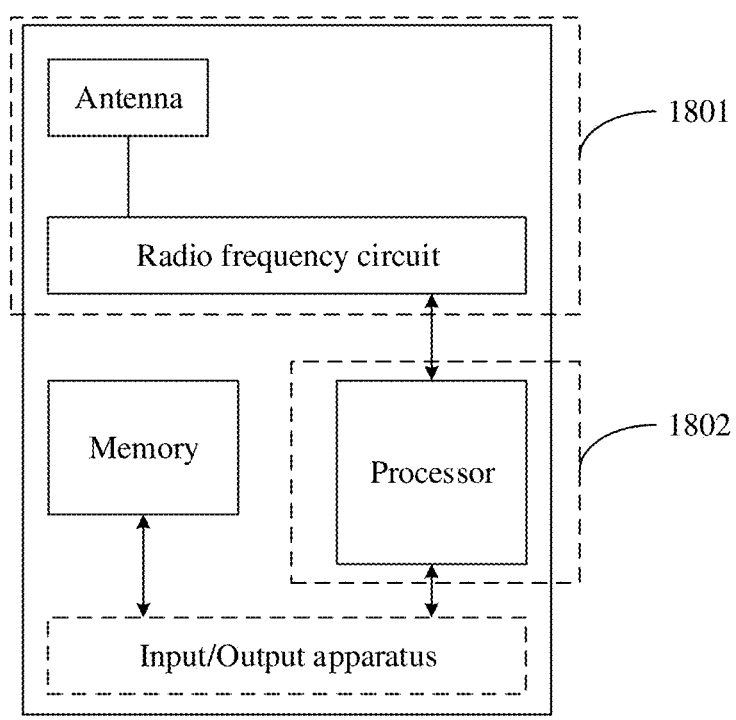
FIG. 18 is a schematic structural diagram of an information receiving apparatus according to an embodiment.

When information receiving apparatuses in FIG. 14 to FIG. 17 are terminal devices, FIG. 18 is a simplified schematic structural diagram of a terminal device. For ease of understanding and illustration, in FIG. 18, an example in which the terminal device is a mobile phone is used. As shown in FIG. 18, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to receive and transmit a radio frequency signal in a form of an electromagnetic wave. The input/output apparatus such as a touchscreen, a display screen, or a keyboard, is mainly configured to: receive data entered by a user, and output data to the user. It should be noted that some types of terminal devices may not have the input/output apparatus.

When data needs to be sent, the processor performs baseband processing on the to-be-sent data, and then outputs a baseband signal to the radio frequency circuit. The radio frequency circuit performs radio frequency processing on the baseband signal, and then sends the radio frequency signal in a form of an electromagnetic wave by using the antenna. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 18 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a transceiving function may be considered as a transceiver unit of the terminal device, and the processor that has a processing function may be considered as a processing unit of the terminal device. As shown in FIG. 18, the terminal device includes a transceiver unit 1801 and a processing unit 1802. The transceiver unit may also be referred to as a transceiver, a transceiver apparatus, or the like. The processing unit may also be referred to as a processor, a processing board, a processing module, a processing apparatus, or the like. The processing unit may be a central processing unit (CPU), a network processor (NP), or a combination of a CPU and an NP. The processing unit may further include a hardware chip. The hardware chip may be an application-specific integrated circuit ASIC), a programmable logic device (PLD), or a combination thereof. The PLD may be a complex programmable logic device (CPLD), a field-programmable gate array (FPGA), generic array logic (GAL), or any combination thereof. Optionally, a component for implementing a receiving function in the transceiver unit 1801 may be considered as a receiving unit, and a component for implementing a sending function in the transceiver unit 1801 may be considered as a sending unit. In other words, the transceiver unit 1801 includes the receiving unit and the sending unit. The transceiver unit may also be sometimes referred to as a transceiver, a transceiver circuit, or the like. The receiving unit may also be sometimes referred to as a receiver, a receiver circuit, or the like. The sending unit may also be sometimes referred to as a transmitter, a transmitter circuit, or the like. When the information receiving apparatus is a chip, the chip includes a transceiver unit and a processing unit. The transceiver unit may be an input/output circuit or a communications interface. The processing unit is a processor, a microprocessor, or an integrated circuit integrated on the chip.

Figure 19:
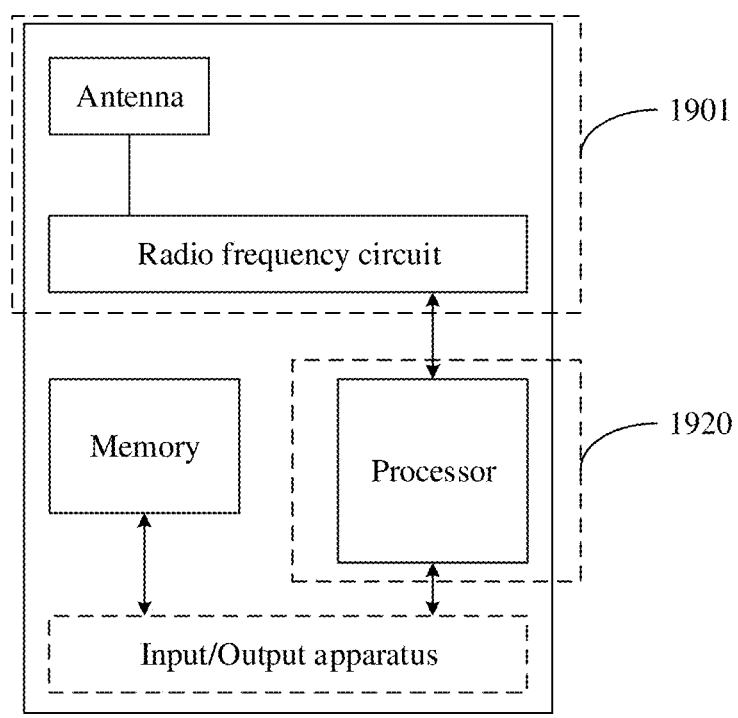
FIG. 19 is a schematic structural diagram of an information sending apparatus according to an embodiment.

When information sending apparatuses in FIG. 10 to FIG. 13 are network devices, specifically, for example, the information sending apparatus is a base station. FIG. 19 is a simplified schematic structural diagram of a base station. The base station includes a part 1901 and a part 1902. The part 1901 is mainly configured to: send and receive a radio frequency signal, and convert the radio frequency signal and a baseband signal. The part 1902 is mainly configured to:

perform baseband processing, control the base station, and the like. The part 1901 may be generally referred to as a transceiver unit, a transceiver, a transceiver circuit, or the like. The part 1902 is generally a control center of the base station, and may be generally referred to as a processing unit, configured to control the base station to perform steps performed by a transmit end device in the foregoing figures. For details, refer to descriptions of the foregoing related parts.

A transceiver unit in the part 1901 may also be referred to as a transceiver, a transceiver, or the like, and includes an antenna and a radio frequency unit. The radio frequency unit is mainly configured to perform radio frequency processing. Optionally, a component for implementing a receiving function in the part 1901 may be considered as a receiving unit, and a component for implementing a sending function may be considered as a sending unit. In other words, the part 1901 includes the receiving unit and the sending unit. The receiving unit may also be referred to as a receiver, a receiver circuit, or the like. The sending unit may also be referred to as a transmitter, a transmitter circuit, or the like.

The part 1902 may include one or more boards. Each board may include one or more processors and one or more memories. The processor is configured to read and execute a program in the memory, to implement a baseband processing function and controlling of the base station. If there are a plurality of boards, the boards may be interconnected to improve a processing capability. In an optional implementation, a plurality of boards may share one or more processors, or a plurality of boards share one or more memories, or a plurality of boards simultaneously share one or more processors.

The information sending apparatus may be a chip, and the chip includes a transceiver unit and a processing unit. The transceiver unit may be an input/output circuit or a communications interface of the chip. The processing unit is a processor, a microprocessor, or an integrated circuit integrated on the chip. The chip may be applied to the foregoing network device, and supports the network device in performing the foregoing methods.

All or some of the foregoing embodiments may be implemented by using software, hardware, firmware, or any combination thereof. When a software program is used to implement the embodiments, the embodiments may be all or partially implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments herein, in a process of implementing this application that claims protection, a person skilled in the art may understand and implement other changes in the disclosed embodiments.

An embodiment further provides a chip. The chip includes a communications interface and a processor. The processor is configured to control the communications interface to receive or send a signal, and is configured to process a signal received by the communications interface or generate a signal to be sent by the communications interface.

Specifically, the processor is configured to perform procedures or steps on a terminal side in the information sending and receiving methods provided in the foregoing method embodiments, or the processor is configured to perform procedures or steps on a network device side in the information sending and receiving methods provided in the foregoing method embodiments.

Optionally, the chip further includes a storage module, and the storage module stores an instruction. The processor reads the instruction stored in the storage module to execute a related operation, and control the communications interface to perform a related transmitting and receiving operation.

It should be understood that, in the embodiments of this application, sequence numbers of the foregoing processes do not mean execution sequences. The execution sequences of the processes should be determined based on functions and internal logic of the processes, and should not be construed as any limitation on the implementation processes of the embodiments.

A person of ordinary skill in the art may be aware that, in combination with the examples described in the embodiments disclosed in this specification, units and algorithm steps can be implemented by electronic hardware or a combination of computer software and electronic hardware. Whether these functions are executed by hardware or software depends on specific applications and design constraints of the technical solutions. A person skilled in the art may use different methods to implement the described functions for each particular application, but it should not be considered that such implementation goes beyond the scope of this application.

It may be clearly understood by a person skilled in the art that, for the purpose of convenient and brief description, for a specific working process of the foregoing system, apparatus, and unit, reference can be made to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedures or functions according to the embodiments are all or partially generated. The computer may be a general-purpose computer, a dedicated computer, a computer network, or another programmable apparatus. The computer instructions may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

A person of ordinary skill in the art may understand that all or some of the procedures of the methods in the embodiments may be implemented by a computer program instructing related hardware. The program may be stored in a computer readable storage medium. When the program runs, the procedures of the foregoing method embodiments may be performed. The foregoing storage medium includes any medium that can store program code, such as a read-only memory (ROM), a random access memory (RAM), a magnetic disk, or an optical disc.

What is claimed is:

1. A data transmission method for wireless communication, the method comprising:
   determining a value of a remaining minimum system information (RMSI) repetition transmission periodicity; and
   sending multiple RMSIs to a terminal device within each RMSI repetition transmission period of the RMSI repetition transmission periodicity, each of the multiple RMSIs being repeatedly sent with the RMSI repetition transmission periodicity within a RMSI scheduling period of 160ms,
   wherein time intervals between time domain reference locations of any two neighboring ones of candidate time domain resources for sending RMSI CORESETs within each RMSI repetition transmission period are the same.

2. The method according to claim 1, wherein the value of the RMSI repetition transmission periodicity is 20ms.

3. The method according to claim 1, wherein each of the multiple RMSIs within each RMSI repetition transmission period corresponds to a respective beam, and wherein sending the multiple RMSIs to the terminal device includes sending each of the multiple RMSIs to the terminal device on a physical downlink shared channel (PDSCH) by using its respective beam.

4. The method according to claim 1, wherein a time domain reference location of each of the candidate time domain resources corresponds to one synchronization signal block (SSB).

5. The method according to claim 1, wherein a value of the time intervals is configured in a master information block (MIB).

6. The method according to claim 1, further comprising indicating the value of the RMSI repetition transmission periodicity by using signaling.

7. The method according to claim 1, wherein the RMSI includes at least one of the following information: configuration information of a random access channel, configuration information of a paging channel, configuration information of a downlink shared channel, configuration information of an uplink shared channel, a public land mobile network identifier list, a tracking area code, cell barring access information, scheduling information of other system information (OSI) or a system information block (SIB), a system information value tag, bandwidth indication information, or cell reselection information.

8. A data transmission method for wireless communication, the method comprising:
   determining a value of a remaining minimum system information (RMSI) repetition transmission periodicity; and
   receiving a RMSI from a network device within a RMSI repetition transmission period of the RMSI repetition transmission periodicity within a RMSI scheduling period of 160ms,
   wherein time intervals between time domain reference locations of any two neighboring ones of candidate time domain resources for carrying RMSI CORESETs within the RMSI repetition transmission period are the same.

9. The method according to claim 8, wherein the value of the RMSI repetition transmission periodicity is 20ms.

10. The method according to claim 8, wherein the received RMSI within the RMSI repetition transmission period corresponds to a respective beam, and wherein receiving the RMSI from the network device includes receiving the RMSI from the network device on a physical downlink shared channel (PDSCH) by using its respective beam.

11. The method according to claim 8, wherein a time domain reference location of each of the candidate time domain resources corresponds to one synchronization signal block (SSB).

12. The method according to claim 8, wherein a value of the time intervals is configured in a master information block (MIB).

13. The method according to claim 8, further comprising receiving signaling indicating the value of the RMSI repetition transmission periodicity.

14. The method according to claim 8, wherein the RMSI includes at least one of the following information: configuration information of a random access channel, configuration information of a paging channel, configuration information of a downlink shared channel, configuration information of an uplink shared channel, a public land mobile network identifier list, a tracking area code, cell barring access information, scheduling information of other system information (OSI) or a system information block (SIB), a system information value tag, bandwidth indication information, or cell reselection information.

15. An apparatus comprising:
   one or more processors;
   a non-transitory memory coupled to the one or more processors, wherein the non-transitory memory stores a program to be executed by the one or more processors, the program including instructions for:
      determining a value of a remaining minimum system information (RMSI) repetition transmission periodicity; and
      sending multiple RMSIs to a terminal device within each RMSI repetition transmission period of the RMSI repetition transmission periodicity, each of the multiple RMSIs being repeatedly sent with the RMSI repetition transmission periodicity within a RMSI scheduling period of 160ms,
      wherein time intervals between time domain reference locations of any two neighboring ones of candidate time domain resources for sending RMSI CORESETs within each RMSI repetition transmission period are the same.

16. The apparatus according to claim 15, wherein the value of the RMSI repetition transmission periodicity is 20ms.

17. The apparatus according to claim 15, wherein each of the multiple RMSIs within each RMSI repetition transmission period corresponds to a respective beam, and wherein sending the multiple RMSIs to the terminal device includes sending each of the multiple RMSIs to the terminal device on a physical downlink shared channel (PDSCH) by using its respective beam.

18. The apparatus according to claim 15, wherein a time domain reference location of each of the candidate time domain resources corresponds to one synchronization signal block (SSB).

19. The apparatus according to claim 15, wherein a value of the time intervals is configured in a master information block (MIB).

20. The apparatus according to claim 15, wherein the program further includes instructions for indicating the value of the RMSI repetition transmission periodicity by using signaling.

21. The apparatus according to claim 15, wherein the RMSI includes at least one of the following information: configuration information of a random access channel, configuration information of a paging channel, configuration information of a downlink shared channel, configuration information of an uplink shared channel, a public land mobile network identifier list, a tracking area code, cell barring access information, scheduling information of other system information (OSI) or a system information block (SIB), a system information value tag, bandwidth indication information, or cell reselection information.

22. An apparatus comprising:
   one or more processors;
   a non-transitory memory coupled to the one or more processors, wherein the non-transitory memory stores a program to be executed by the one or more processors, the program including instructions for:
      determining a value of a remaining minimum system information (RMSI) repetition transmission periodicity; and
      receiving a RMSI from a network device within a RMSI repetition transmission period of the RMSI repetition transmission periodicity within a RMSI scheduling period of 160ms,
      wherein time intervals between time domain reference locations of any two neighboring ones of candidate time domain resources for carrying RMSI CORESETs within the RMSI repetition transmission period are the same.

23. The apparatus according to claim 22, wherein the value of the RMSI repetition transmission periodicity is 20ms.

24. The apparatus according to claim 22, wherein the received RMSI within the RMSI repetition transmission period corresponds to a respective beam, and wherein receiving the RMSI from the network device includes receiving the RMSI from the network device on a physical downlink shared channel (PDSCH) by using its respective beam.

25. The apparatus according to claim 22, wherein a time domain reference location of each of the candidate time domain resources corresponds to one synchronization signal block (SSB).

26. The apparatus according to claim 22, wherein a value of the time intervals is configured in a master information block (MIB).

27. The apparatus according to claim 22, wherein the program includes further instructions for receiving signaling indicating the value of the RMSI repetition transmission periodicity.

28. The apparatus according to claim 22, wherein the RMSI includes at least one of the following information: configuration information of a random access channel, configuration information of a paging channel, configuration information of a downlink shared channel, configuration information of an uplink shared channel, a public land mobile network identifier list, a tracking area code, cell barring access information, scheduling information of other system information (OSI) or a system information block (SIB), a system information value tag, bandwidth indication information, or cell reselection information.

29. A system comprising:
   a transmitter and a receiver,
   wherein the transmitter is configured to perform the following:
      sending multiple RMSIs to the receiver within each RMSI repetition transmission period of a remaining minimum system information (RMSI) repetition transmission periodicity, each of the multiple RMSIs being repeatedly sent with the RMSI repetition transmission periodicity within a RMSI scheduling period of 160ms, and
   wherein the receiver is configured to perform the following:
      determining a value of the RMSI repetition transmission periodicity; and
      receiving at least one of the multiple RMSIs from the transmitter within the RMSI repetition transmission period of the RMSI repetition transmission periodicity within the RMSI scheduling period of 160ms,
      wherein time intervals between time domain reference locations of any two neighboring ones of candidate time domain resources for carrying RMSI CORESETs within the RMSI repetition transmission period are the same.

30. The system according to claim 29, wherein the value of the RMSI repetition transmission periodicity determined by the receiver is 20ms.

31. The system according to claim 29, wherein each of the multiple RMSIs within each RMSI repetition transmission period corresponds to a respective beam, and wherein sending the multiple RMSIs to the receiver includes sending each of the multiple RMSIs to the receiver on a physical downlink shared channel (PDSCH) by using its respective beam.

32. The system according to claim 29, wherein a time domain reference location of each of the candidate time domain resources corresponds to one synchronization signal block (SSB).

* * * * *

UNITED STATES PATENT AND TRADEMARK OFFICE
CERTIFICATE OF CORRECTION

| | | |
|---|---|---|
| PATENT NO. | : 11,659,527 B2 | Page 1 of 1 |
| APPLICATION NO. | : 16/786535 | |
| DATED | : May 23, 2023 | |
| INVENTOR(S) | : Kuandong Gao et al. | |

It is certified that error appears in the above-identified patent and that said Letters Patent is hereby corrected as shown below:

In the Specification

In the Detailed Description of Illustrative Embodiments, Column 16, Line 2, delete "20 MS" and insert --20 ms--.

In the Detailed Description of Illustrative Embodiments, Column 16, Line 41, delete "20 MS" and insert --20 ms--.

Signed and Sealed this
Twenty-seventh Day of June, 2023

Katherine Kelly Vidal
*Director of the United States Patent and Trademark Office*